US012804574B2

(12) United States Patent
Ma et al.

(10) Patent No.: US 12,804,574 B2
(45) Date of Patent: Nov. 17, 2026

(54) CLOSED-LOOP AND OPEN-LOOP TIMING ADVANCE IN NTN

(71) Applicant: QUALCOMM Incorporated, San Diego, CA (US)

(72) Inventors: Liangping Ma, San Diego, CA (US); Xiao Feng Wang, San Diego, CA (US); Changhwan Park, San Diego, CA (US); Peter Gaal, San Diego, CA (US); Alberto Rico Alvarino, San Diego, CA (US); Ayan Sengupta, San Diego, CA (US); Bharat Shrestha, San Diego, CA (US); Umesh Phuyal, San Diego, CA (US); Huilin Xu, Temecula, CA (US); Jun Ma, San Diego, CA (US); Wanshi Chen, San Diego, CA (US); Juan Montojo, San Diego, CA (US); Yiqing Cao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 373 days.

(21) Appl. No.: 18/567,225

(22) PCT Filed: Aug. 6, 2021

(86) PCT No.: PCT/CN2021/111327
§ 371 (c)(1),
(2) Date: Dec. 5, 2023

(87) PCT Pub. No.: WO2023/010572
PCT Pub. Date: Feb. 9, 2023

(65) Prior Publication Data

US 2024/0267865 A1 Aug. 8, 2024

(51) Int. Cl.
*H04W 56/00* (2009.01)
*H04B 7/185* (2006.01)

(52) U.S. Cl.
CPC .... *H04W 56/0045* (2013.01); *H04B 7/18513* (2013.01)

(58) Field of Classification Search
CPC ........... H04W 56/0045; H04W 56/007; H04W 56/009; H04B 7/18513; H04B 7/18563
See application file for complete search history.

(56) References Cited

U.S. PATENT DOCUMENTS 9,503,246 B2 * 11/2016 Bergström ........ H04W 56/0045
12,309,730 B2 * 5/2025 Tsai .................... H04W 56/005
(Continued)

FOREIGN PATENT DOCUMENTS

CN 103558585 A 2/2014
WO 2020204442 A1 10/2020
WO WO-2023012403 A1 * 2/2023 ............. G01S 19/00

OTHER PUBLICATIONS

ZTE, "Discussion on UL synchronization for NR-NTN", R1-2105190, May 10-27, 2021, 3GPP TSG RAN WG1 #105-e, e-Meeting, All Pages (Year: 2021).*
(Continued)

*Primary Examiner* — Ayaz R Sheikh
*Assistant Examiner* — Tarell A Hampton
(74) *Attorney, Agent, or Firm* — Procopio, Cory, Hargreaves & Savitch LLP

(57) ABSTRACT

A user equipment (UE) receives one or more timing advance commands from a non-terrestrial network (NTN). The UE resets, after a GNSS fix, a cumulative timing advance value based on the one or more timing advance commands from the NTN and transmits an uplink transmission with a timing advance based on a self-estimated delay and the cumulative timing advance value. The UE may adjust a self-estimated delay based on at least one GNSS fix. The UE may transmit an uplink transmission with a timing advance based on the
(Continued)

adjusted self-estimated delay and a cumulative timing advance value based on the one or more timing advance commands from the NTN.

36 Claims, 17 Drawing Sheets

(56) References Cited

U.S. PATENT DOCUMENTS

| | | | | |
|---|---|---|---|---|
| 2003/0193409 | A1* | 10/2003 | Crank | G08G 5/74 340/970 |
| 2013/0142106 | A1* | 6/2013 | Zhang | H04W 56/0045 370/315 |
| 2013/0201910 | A1* | 8/2013 | Bergstrom | H04L 5/001 370/328 |
| 2013/0328726 | A1* | 12/2013 | Riley | G01S 19/40 342/450 |
| 2014/0064126 | A1* | 3/2014 | Lim | H04W 64/00 370/252 |
| 2015/0042812 | A1* | 2/2015 | Tang | G06V 20/647 348/157 |
| 2015/0304804 | A1* | 10/2015 | Lotito | G06F 3/017 455/41.1 |
| 2015/0346347 | A1* | 12/2015 | Tsai | G01S 19/34 342/357.63 |
| 2019/0191399 | A1* | 6/2019 | Islam | H04W 56/005 |
| 2019/0265350 | A1* | 8/2019 | Hawker | G01C 21/1652 |
| 2020/0309929 | A1* | 10/2020 | Johnson | G01C 23/00 |
| 2021/0010245 | A1* | 1/2021 | Graves | E02F 9/264 |
| 2021/0029658 | A1 | 1/2021 | Mahalingam et al. | |
| 2021/0105761 | A1* | 4/2021 | Cheng | H04L 5/0053 |
| 2021/0168869 | A1* | 6/2021 | Gupta | H04L 27/2607 |
| 2021/0176726 | A1* | 6/2021 | Vyunova | H04W 4/023 |
| 2021/0337598 | A1* | 10/2021 | Ma | H04W 56/0045 |
| 2022/0046661 | A1* | 2/2022 | Jeon | H04W 72/23 |
| 2022/0095258 | A1* | 3/2022 | Yeo | H04W 56/0045 |
| 2022/0124795 | A1* | 4/2022 | Wu | H04W 56/0045 |
| 2022/0225414 | A1* | 7/2022 | Ma | H04B 7/0602 |
| 2022/0295225 | A1* | 9/2022 | Keating | H04W 4/029 |
| 2022/0408389 | A1* | 12/2022 | Wang | H04L 5/0053 |
| 2023/0072679 | A1* | 3/2023 | Lauridsen | H04B 7/18513 |
| 2023/0388952 | A1* | 11/2023 | Khoshkholgh Dashtaki | H04B 7/18513 |
| 2023/0397196 | A1* | 12/2023 | Nishio | H04L 5/0053 |
| 2023/0397247 | A1* | 12/2023 | Jung | H04B 7/18519 |
| 2023/0422195 | A1* | 12/2023 | Yao | H04W 56/0045 |
| 2024/0064735 | A1* | 2/2024 | Atungsiri | H04B 7/18513 |
| 2024/0121737 | A1* | 4/2024 | Shin | H04B 7/1851 |
| 2024/0172156 | A1* | 5/2024 | Grau | H04W 56/0045 |
| 2024/0292347 | A1* | 8/2024 | Manolakis | H04B 7/18513 |
| 2025/0048291 | A1* | 2/2025 | Shin | H04W 56/0045 |

OTHER PUBLICATIONS

Moderator (Thales): "FL Summary #1 on Enhancements on UL Time and Frequency Synchronization for NR NTN", 3GPP TSG-RAN WG1 Meeting #106-e, R1-210xxxx, e-Meeting, Aug. 16, 2021-Aug. 27, 2021, pp. 1-84, Aug. 15, 2021, XP093255630, Par. 6.1, p. 29-p. 30.

Moderator (Thales): "FL Summary on Enhancements on UL Time and Frequency Synchronization For NR NTN", P3GPP TSG-RAN WG1 Meeting #104-e, R1-2102028, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, 86 Pages, Feb. 3, 2021, XP052170849, p. 3-p. 4.

Supplementary European Search Report—EP21952445—Search Authority—The Hague—Mar. 13, 2025.

International Search Report and Written Opinion—PCT/CN2021/111327—ISA/EPO—Apr. 29, 2022.

* cited by examiner

CLOSED-LOOP AND OPEN-LOOP TIMING ADVANCE IN NTN

CROSS REFERENCE TO RELATED APPLICATION(S)

This application is a National Stage Application filed under 35 U.S.C. § 371 of PCT International Application No. PCT/CN2021/111327, entitled "CLOSED-LOOP AND OPEN-LOOP TIMING ADVANCE IN NTN" and filed Aug. 6, 2021, which is expressly incorporated by reference herein in its entirety.

TECHNICAL FIELD

The present disclosure relates generally to communication systems, and more particularly, to wireless communication including a timing advance.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided at a user equipment (UE). The apparatus receives one or more timing advance commands from a non-terrestrial network (NTN). The apparatus resets, after a GNSS fix, a cumulative timing advance value based on the one or more timing advance commands from the NTN and transmits an uplink transmission with a timing advance based on a self-estimated delay and the cumulative timing advance value.

In an aspect of the disclosure, a method, a computer-readable medium, and an apparatus are provided at a UE. The apparatus receives one or more timing advance commands from an NTN and calculates an adjusted self-estimated delay based on at least one GNSS fix. The apparatus transmits an uplink transmission with a timing advance based on the adjusted self-estimated delay and a cumulative timing advance value based on the one or more timing advance commands from the NTN.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
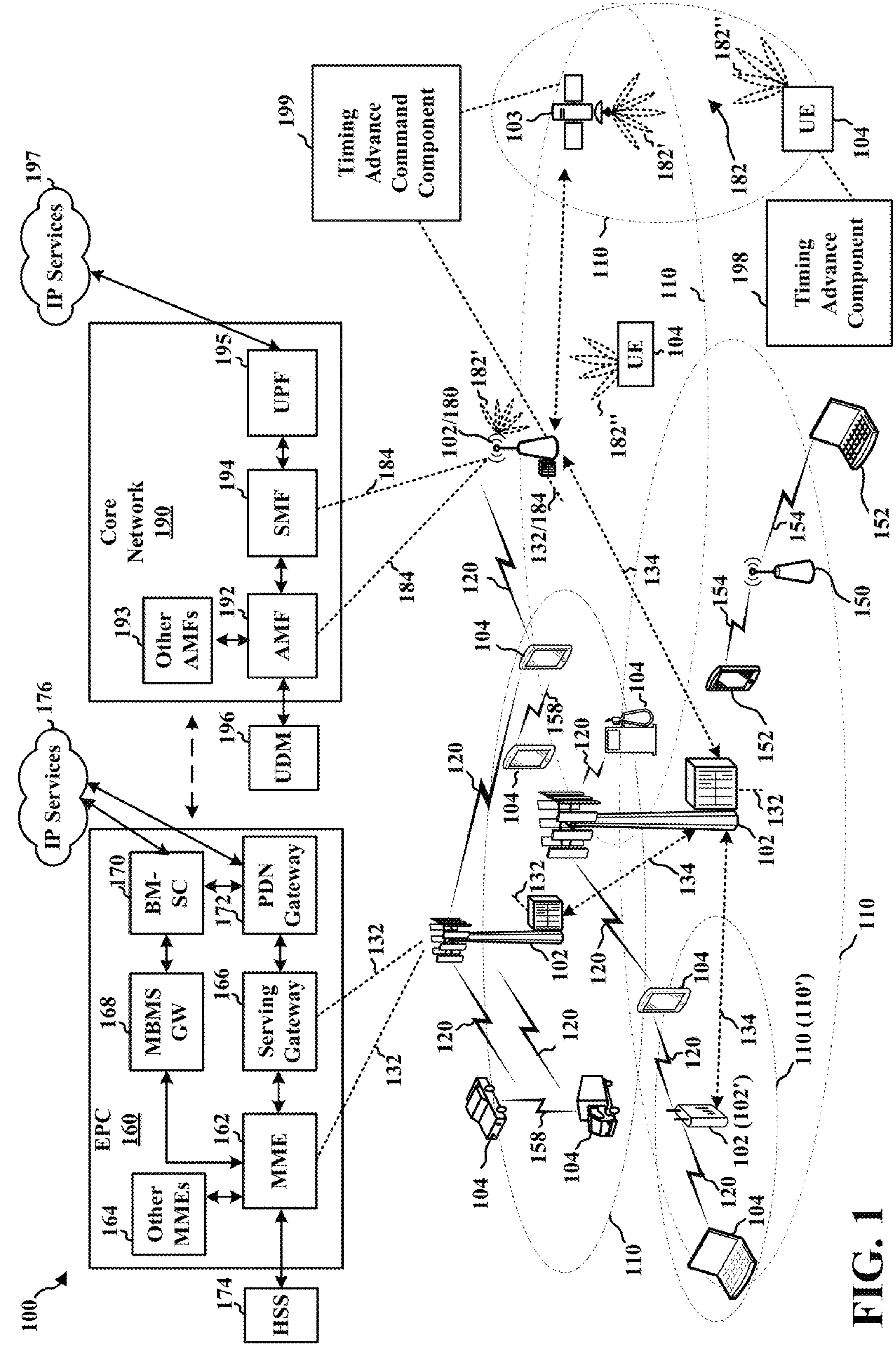
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102 or 180, UEs 104, an Evolved Packet Core (EPC) 160, and another core network 190 (e.g., a 5G Core (5GC)). In certain aspects, the UE 104 may be configured to access a radio cell supported by an NTN device 103. The NTN device 103 may be referred to as a spaceborne vehicle or an airborne vehicle. In some examples, the NTN device 103 may be configured to operate as a relay for communications between the UEs 104 and the base stations 102, 180. In such examples, the NTN device 103 may be referred to as a transparent payload and the base stations 102, 180 may be referred to as terrestrial base stations 102, 180. In some examples, the NTN device 103 may include an on-board base station and/or a disaggregated base station. In such examples, the NTN device 103 may be referred to as a regenerative payload and/or as an NTN base station. The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHZ (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71GHz), FR4 (52.6 GHz-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHZ spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may receive one or more timing advance commands from an NTN. For example, a base station 102 or 180 may include a timing advance command component 199 that transmits the timing advance command to the UE 104. In some aspects, the UE may include a timing advance component 198 configured to reset, after a GNSS fix, a cumulative timing advance value based on the one or more timing advance commands from the NTN and to transmit an uplink transmission with a timing advance based on at least a self-estimated delay and the cumulative timing advance value. In some aspects, the UE may include a timing advance component 198 configured to calculate an adjusted self-estimated delay based on at least one GNSS fix and to transmit an uplink transmission with a timing advance based on at least the adjusted self-estimated delay and a cumulative timing advance value based on the one or more timing advance commands from the NTN. Although the following description may be focused on 5G NR, the concepts described herein may be applicable to other similar areas, such as LTE, LTE-A, CDMA, GSM, and other wireless technologies.

Figures 2A, 2B, 2C, 2D:
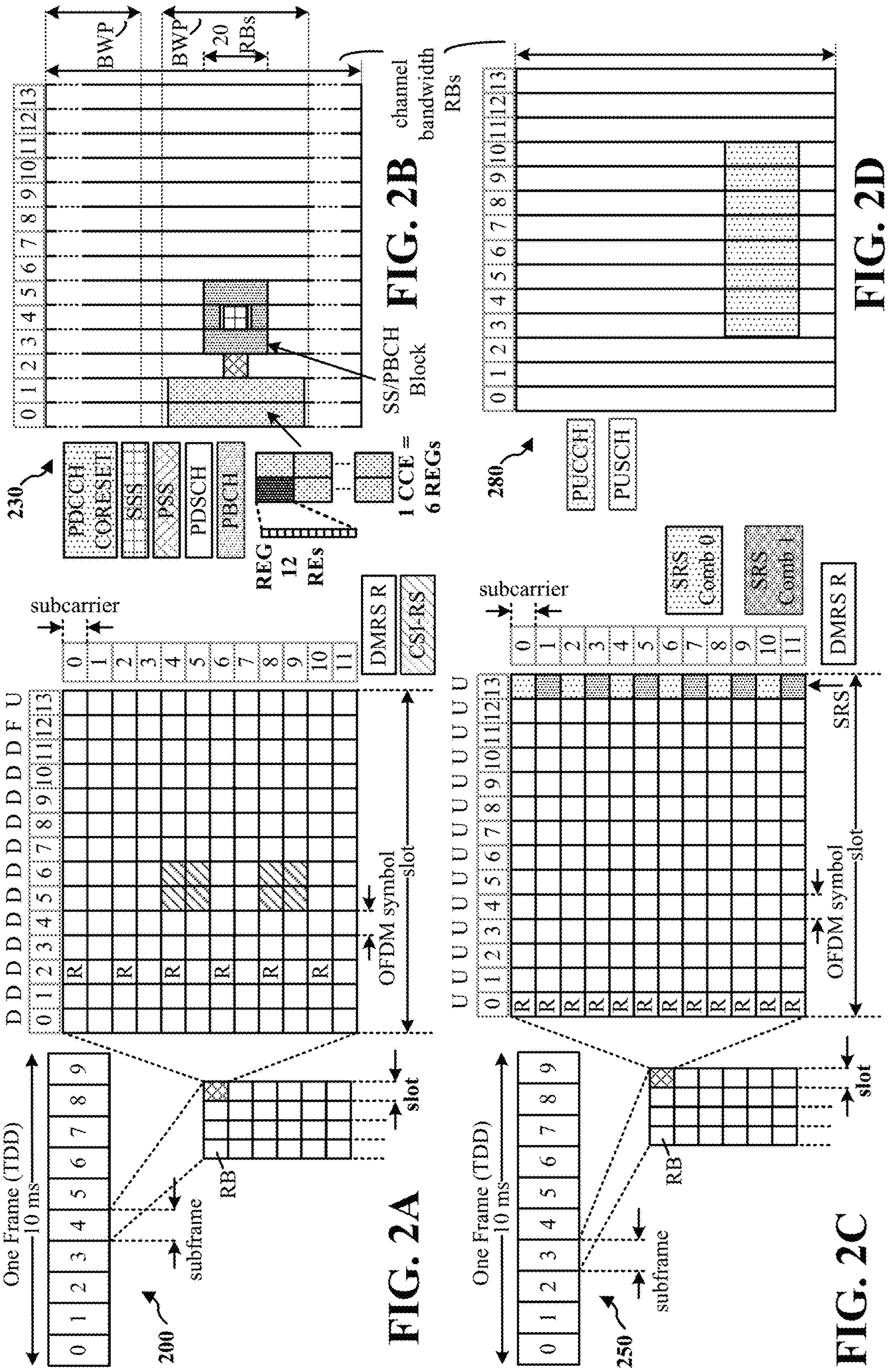
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
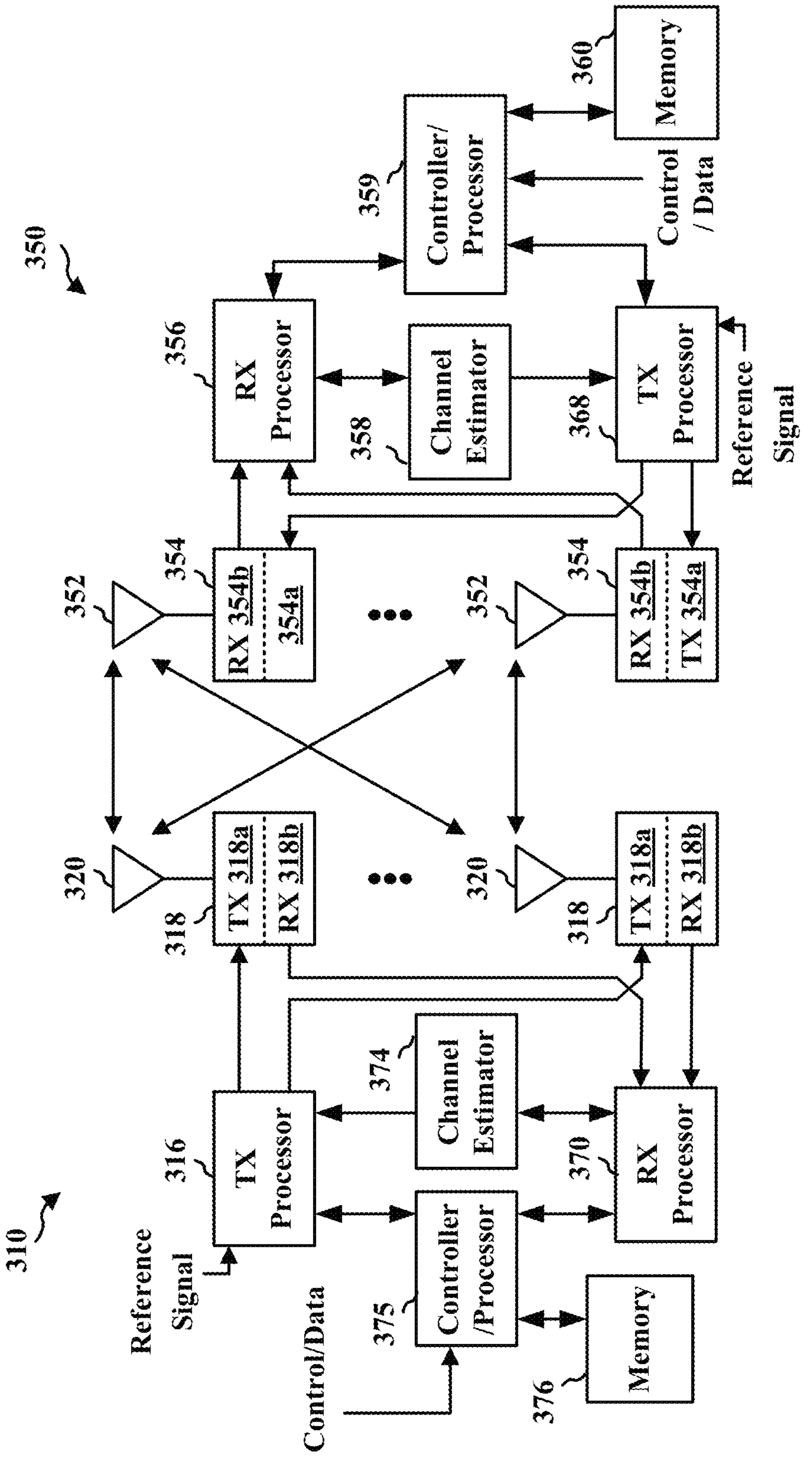
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the timing advance component 198 of FIG. 1.

Satellites may be integrated with the terrestrial infrastructure of a wireless communication system. Satellites may refer to Low Earth Orbit (LEO) devices, Medium Earth Orbit (MEO) devices, Geostationary Earth Orbit (GEO) devices, and/or Highly Elliptical Orbit (HEO) devices. A non-terrestrial network (NTN) may refer to a network, or a segment of a network, that uses an airborne or spaceborne vehicle for transmission. An airborne vehicle may refer to High Altitude Platforms (HAPs) including Unmanned Aircraft Systems (UAS).

An NTN may help to provide wireless communication in un-served or underserved areas to upgrade the performance of terrestrial networks. For example, a communication satellite may provide coverage to a larger geographic region than a TN base station. The NTN may also reinforce service reliability by providing service continuity for UEs or for moving platforms (e.g., passenger vehicles-aircraft, ships, high speed trains, buses). The NTN may also increase service availability, including critical communications. The NTN may also enable network scalability through the provision of efficient multicast/broadcast resources for data delivery towards the network edges or even directly to the user equipment.

Figure 4:
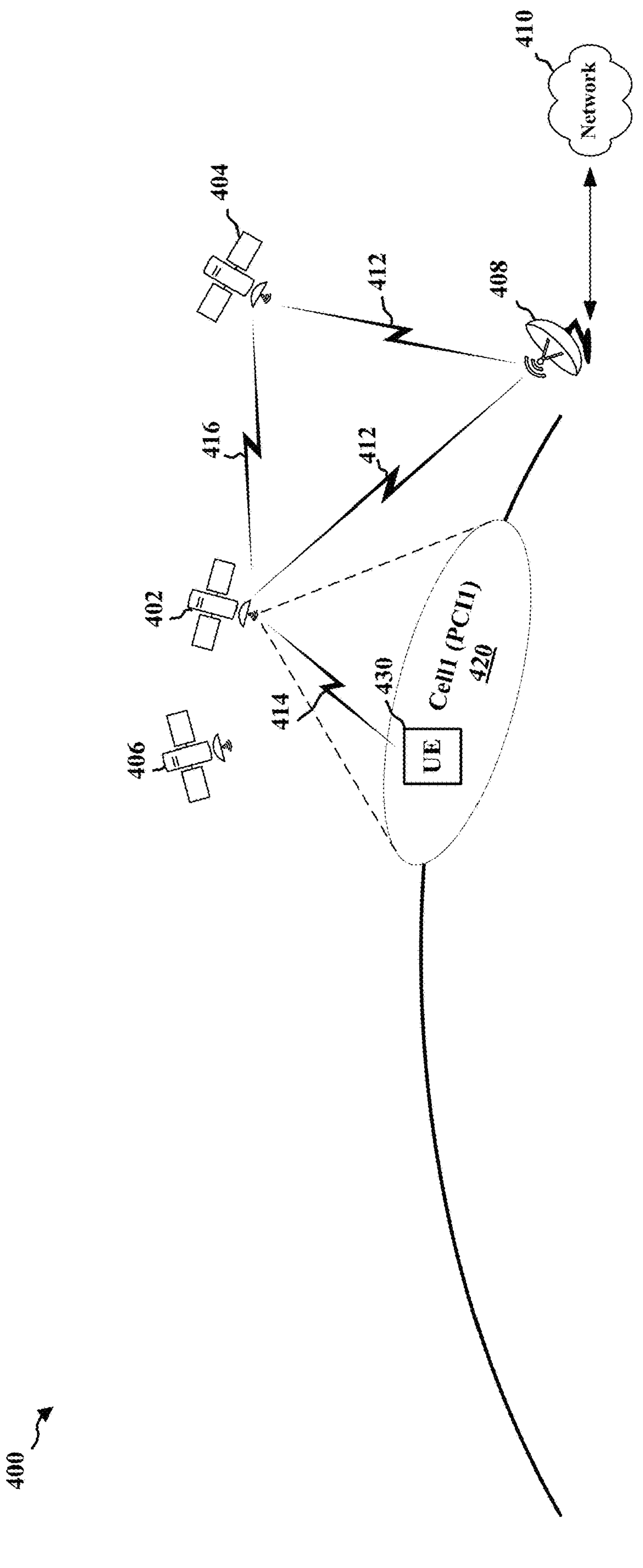
FIG. 4 illustrates an example of an NTN configuration, in accordance with various aspects of the present disclosure.

FIG. 4 illustrates an example of an NTN 400 configuration, as presented herein. An NTN may refer to a network, or a segment of a network, that uses RF resources on-board an NTN platform. The NTN platform may refer to a spaceborne vehicle or an airborne vehicle. Spaceborne vehicles include communication satellites that may be classified based on their orbits. For example, a communication satellite may include a GEO device that appears stationary with respect to the Earth. As such, a single GEO device may provide coverage to a geographic coverage area. In other examples, a communication satellite may include a non-GEO device, such as an LEO device, an MEO device, or an HEO device. Non-GEO devices do not appear stationary with respect to the Earth. As such, a satellite constellation (e.g., one or more satellites) may be configured to provide coverage to the geographic coverage area. An airborne vehicle may refer to a system encompassing Tethered UAS (TUA), Lighter Than Air UAS (LTA), Heavier Than Air UAS (HTA), e.g., in altitudes typically between 8 and 50 km including High Altitude Platforms (HAPs).

In some aspects, the NTN 400 may comprise an NR-NTN. The example of FIG. 4 provides that the NTN 400 may include a first NTN device 402, a second NTN device 404, a third NTN device 406, an NTN gateway 408, a data network 410, and a UE 430 within a cell coverage of the first NTN device 402. In some aspects, the UE 430 may include IoT devices, and the UE may be connected to the NTN 400 for wireless communication.

The NTN gateway 408 may be one of one or more NTN gateways that may connect the NTN 400 to a public data network. In some examples, the NTN gateway 408 may support functions to forward a signal from the NTN device to a Uu interface, such as an NR-Uu interface. In other examples, the NTN gateway 408 may provide a transport network layer node, and may support transport protocols, such as acting as an IP router. A satellite radio interface (SRI) may provide IP trunk connections between the NTN gateway 408 and the NTN device to transport NG or F1 interfaces, respectively. One or more geosynchronous equatorial orbit (GEO) devices (e.g., which may be referred to herein as the first NTN device 402, the second NTN device 404, or the third NTN device 406) may be fed by the NTN gateway 408, and the one or more NTN devices may be deployed across the satellite targeted coverage, which may correspond to regional coverage or even continental coverage. A non-GEO device may be served successively by one or more NTN gateways at a time, and the NTN 400 may be configured to provide service and feeder link continuity between the successive serving NTN gateways with time duration to perform mobility anchoring and handover.

The first NTN device 402, including spaceborne vehicles or airborne vehicles, may communicate with the data network 410 through a feeder link 412 established between the first NTN device 402 and the NTN gateway 408 in order to provide service to the UE 430 within the cell coverage, or a field-of-view of an NTN cell 420, of the first NTN device 402 via a service link 414. The feeder link 412 may include a wireless link between an NTN gateway and an NTN device. The service link 414 may refer to a radio link between an NTN device (e.g., the first NTN device 402) and the UE 430. As described in connection with FIG. 1, the first NTN device 402 may use one or more directional beams, e.g., beamforming, to exchange communication with the UE 430. A beam may refer to a wireless communication beam generated by an antenna on-board an NTN device.

In some examples, the UE 430 may communicate with the first NTN device 402 via the service link 414. The second NTN device 404 may relay the communication for the first NTN device 402 through an inter-satellite link (ISL) 416, and the second NTN device 404 may communicate with the data network 410 through the feeder link 412 established between the second NTN device 404 and the NTN gateway 408. The ISL links may be provided between a constellation of satellites and may involve the use of transparent payloads on-board the NTN devices. The ISL may operate in an RF frequency or an optical band.

In the illustrated example of FIG. 4, the first NTN device 402 may provide the NTN cell 420 with a first physical cell ID (PCI) ("PCI1"). In some examples, a constellation of satellites may provide coverage to the NTN cell 420. For example, the first NTN device 402 may include a non-GEO device that does not appear stationary with respect to the Earth. As such, a satellite constellation (e.g., one or more satellites) may be configured to provide coverage to the NTN cell 420. For example, the first NTN device 402 and the third NTN device 406 may be part of a satellite constellation that provides coverage to the NTN cell 420.

In some examples, an NTN deployment may provide different services based on the type of payload on-board the NTN device. The type of payload may determine whether the NTN device acts as a relay node or a base station. For example, a transport payload may implement frequency conversion and a radio frequency (RF) amplifier in both uplink (UL) and downlink (DL) directions and may correspond to an analog RF repeater. A transparent payload, for example, may receive UL signals from all served UEs and may redirect the combined signals DL to an earth station without demodulating or decoding the signals. Similarly, a transparent payload may receive an UL signal from an earth station and redirect the signal DL to served UEs without demodulating or decoding the signal. However, the transparent payload may frequency convert received signals and may amplify and/or filter received signals before transmitting the signals.

Figure 5:
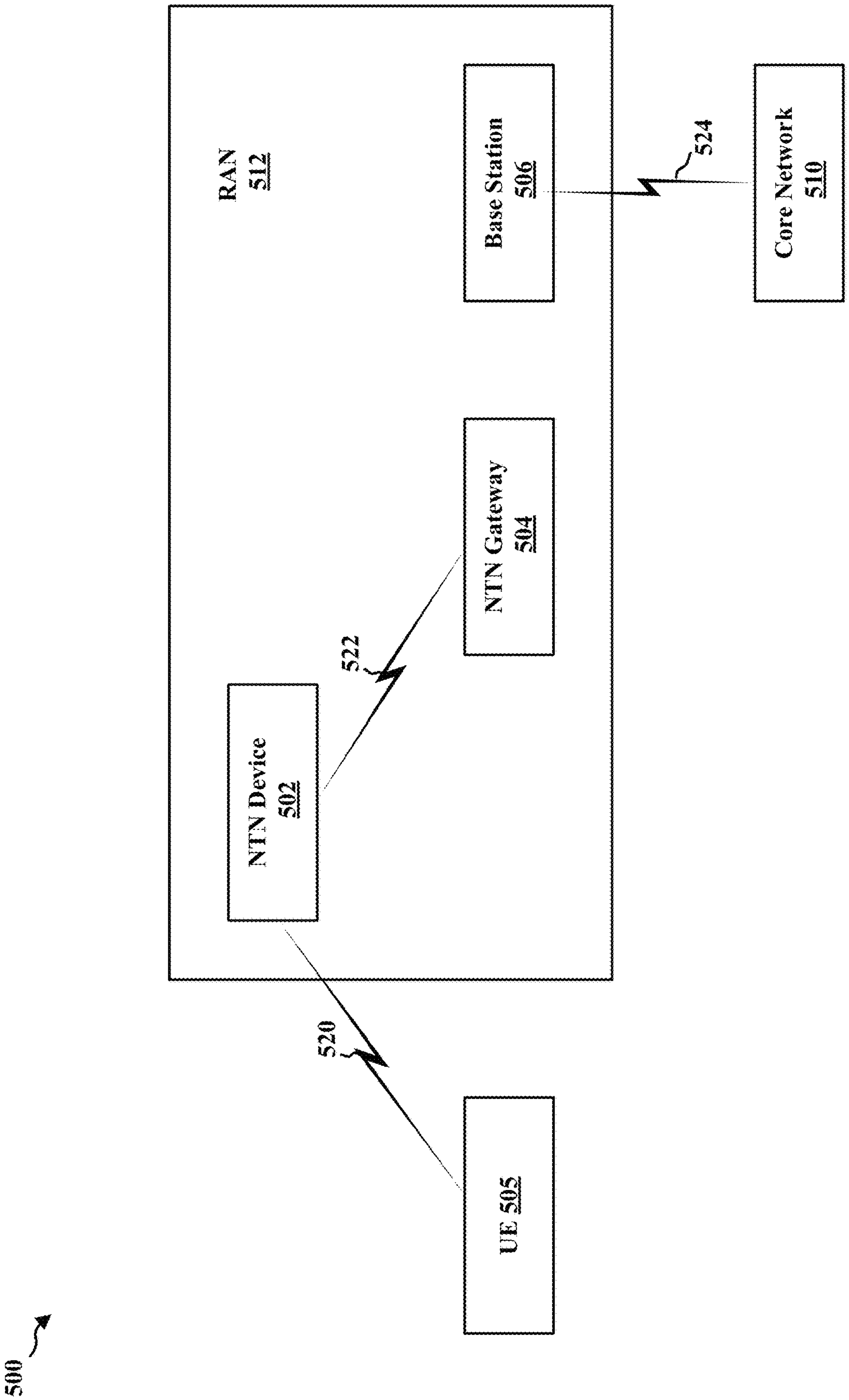
FIG. 5 illustrates an example network architecture capable of supporting NTN access, in accordance with various aspects of the present disclosure.

FIG. 5 illustrates an example network architecture 500 capable of supporting NTN access. Although the aspects are described using the example of a 5G NR system, the concepts presented herein may also be applied for other types of core networks. FIG. 5 illustrates a network architecture with transparent payloads.

The network architecture 500 of FIG. 5 includes a UE 505, an NTN device 502, an NTN gateway 504 (sometimes referred to as "gateways," "earth stations," or "ground stations"), and a base station 506 having the capability to communicate with the UE 505 via the NTN device 502. The NTN device 502, the NTN gateway 504, and the base station 506 are part of a RAN 512.

The base station 506 may correspond to the base station 310 of FIG. 3. The network architecture 500 is illustrated as further including a core network 510. The core network 510 (e.g., which may correspond to core network 190) may be a public land mobile network (PLMN) located in a single country or in different countries.

Connections in the network architecture 500 with transparent payloads allow the base station 506 to access the NTN gateway 504 and the core network 510. In some examples, the base station 506 may be shared by multiple PLMNs. Similarly, the NTN gateway 504 may be shared by more than one base station.

FIG. 5 provides only a generalized illustration of various components, any or all of which may be utilized as appropriate, and each of which may be duplicated or omitted, as necessary. Specifically, although the example of FIG. 5 includes one UE 505, it will be understood that many UEs (e.g., hundreds, thousands, millions, etc.) may utilize the network architecture 500. Similarly, the network architecture 500 may include a larger (or smaller) number of NTN devices, NTN gateways, base stations, RAN, core networks, and/or other components. The illustrated connections that connect the various components in the network architecture 500 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 505 is configured to communicate with the core network 510 via the NTN device 502, the NTN gateway 504, and the base station 506. As illustrated by the RAN 512, one or more RANs associated with the core network 510 may include one or more base stations. Access to the network may be provided to the UE 505 via wireless communication between the UE 505 and the base station 506 (e.g., a serving base station), via the NTN device 502 and the NTN gateway 504. The base station 506 may provide wireless communications access to the core network 510 on behalf of the UE 505, e.g., using 5G NR.

The base station 506 may be referred to by other names such as a gNB, a "satellite node", a satellite NodeB (sNB), or "satellite access node." The base station 506 may not be the same as terrestrial gNBs, but may be based on a terrestrial gNB with additional capability. For example, the base station 506 may terminate the radio interface and associated radio interface protocols to the UE 505 and may transmit DL signals to the UE 505 and receive UL signals from the UE 505 via the NTN device 502 and the NTN gateway 504. The base station 506 may also support signaling connections and voice and data bearers to the UE 505 and may support handover of the UE 505 between different radio cells for the NTN device 502, between different NTN devices and/or between different base stations. The base station 506 may be configured to manage moving radio beams (e.g., for airborne vehicles and/or non-GEO devices) and associated mobility of the UE 505. The base station 506 may assist in the handover (or transfer) of the NTN device 502 between different NTN gateways, different base stations, and between different countries. In some examples, the base station 506 may be separate from the NTN gateway 504, e.g., as illustrated in the example of FIG. 5. In some examples, the base station 506 may include or may be combined with one or more NTN gateways, e.g., using a split architecture. For example, with a split architecture, the base station 506 may include a Central Unit (CU) and the NTN gateway 504 may include or act as Distributed Unit (DU). The base station 506 may be fixed on the ground with transparent payload operation. In one implementation, the base station 506 may be physically combined with, or physically connected to, the NTN gateway 504 to reduce complexity and cost.

The NTN gateway 504 may be dedicated to one associated constellation of NTN devices. The NTN gateway 504 may be included within the base station 506, e.g., as a base station-DU within the base station 506. The NTN gateway 504 may communicate with the NTN device 502 using control and user plane protocols. The control and user plane protocols between the NTN gateway 504 and the NTN device 502: (i) establish and release the NTN gateway 504 to the NTN device 502 communication links, including authentication and ciphering; (ii) update NTN device software and firmware; (iii) perform NTN device Operations and Maintenance (O&M); (iv) control radio beams (e.g., direction, power, on/off status) and mapping between radio beams and NTN gateway UL and DL payload; and/or (v) assist with handoff of the NTN device 502 or radio cell to another NTN gateway.

In the illustrated example of FIG. 5, a service link 520 may facilitate communication between the UE 505 and the NTN device 502, a feeder link 522 may facilitate communication between the NTN device 502 and the NTN gateway 504, and an interface 524 may facilitate communication between the base station 506 and the core network 510. The service link 520 and the feeder link 522 may be implemented by a same radio interface (e.g., the NR-Uu interface). The interface 524 may be implemented by the NG interface.

Figure 6:
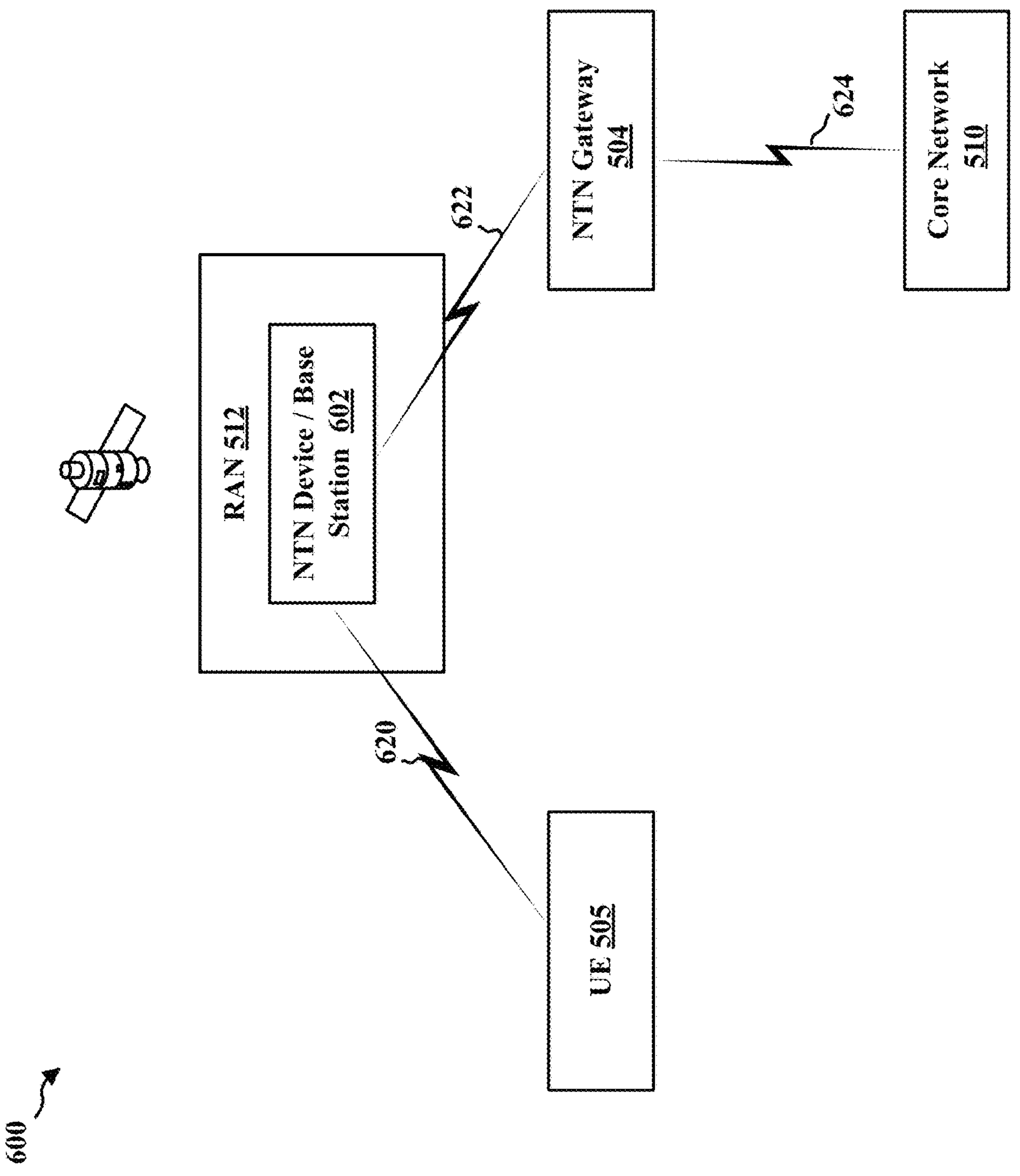
FIG. 6 shows a diagram of another network architecture capable of supporting NTN access, in accordance with various aspects of the present disclosure.

FIG. 6 shows a diagram of a network architecture 600 capable of supporting NTN access. The network architecture 600 shown in FIG. 6 is similar to that shown in FIG. 5, like designated elements being similar or the same. FIG. 6, however, illustrates a network architecture with regenerative payloads, as opposed to transparent payloads shown in FIG. 5. A regenerative payload, unlike a transparent payload, includes an on-board base station (e.g., includes the functional capability of a base station), and is referred to herein as an NTN device/base station 602. The on-board base station may correspond to the base station 310 in FIG. 3. The RAN 512 is illustrated as including the NTN device/base station 602. Reference to the NTN device/base station 602 may refer to functions related to communication with the UE 505 and the core network 510 and/or to functions related to communication with the NTN gateway 504 and with the UE 505 at a physical radio frequency level.

An onboard base station may perform many of the same functions as the base station 506 as described previously. For example, the NTN device/base station 602 may terminate the radio interface and associated radio interface protocols to the UE 505 and may transmit DL signals to the UE 505 and receive UL signals from the UE 505, which may include encoding and modulation of transmitted signals and demodulation and decoding of received signals. The NTN device/base station 602 may also support signaling connections and voice and data bearers to the UE 505 and may support handover of the UE 505 between different radio cells for the NTN device/base station 602 and between different NTN device/base stations. The NTN device/base station 602 may assist in the handover (or transfer) of the NTN device/base station 602 between different NTN gateways, different control networks, and between different countries. The NTN device/base station 602 may hide or obscure specific aspects of the NTN device/base station 602 from the core network 510, e.g., by interfacing to the core network 510 in the same way or in a similar way to a terrestrial base station. The NTN device/base station 602 may further assist in sharing of the NTN device/base station 602 over multiple countries. The NTN device/base station 602 may communicate with one or more NTN gateways and with one or more core networks via the NTN gateway 504. In some aspects, the NTN device/base station 602 may communicate directly with other NTN device/base stations using Inter-Satellite Links (ISLs), which may support an Xn interface between any pair of NTN device/base stations.

In the illustrated example of FIG. 6, a service link 620 may facilitate communication between the UE 505 and the NTN device/base station 602, a feeder link 622 may facilitate communication between the NTN device/base station 602 and the NTN gateway 504, and an interface 624 may facilitate communication between the NTN gateway 504 and the core network 510. The service link 620 may be implemented by the NR-Uu interface. The feeder link 622 may be implemented by the NG interface over SRI. The interface 624 may be implemented by the NG interface.

Figure 7:
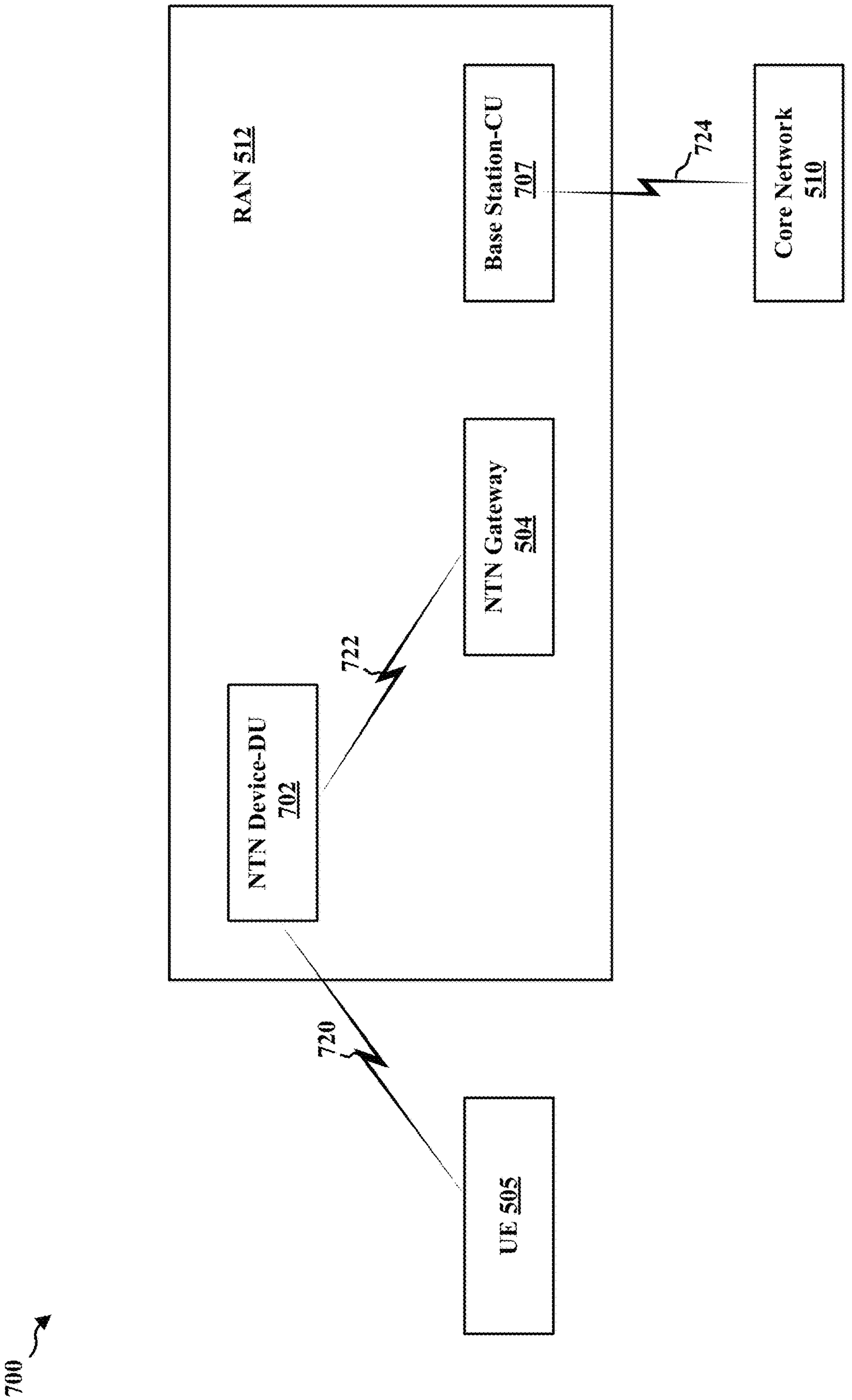
FIG. 7 shows a diagram of another network architecture capable of supporting NTN access, in accordance with various aspects of the present disclosure.

FIG. 7 shows a diagram of a network architecture 700 capable of supporting NTN access. The network architecture shown in FIG. 7 is similar to that shown in FIGS. 5 and 6, like designated elements being similar or the same. FIG. 7, however, illustrates a network architecture with regenerative payloads, as opposed to transparent payloads, as shown in FIG. 5, and with a split architecture for the base stations. For example, the base stations may be split between a Central Unit (CU) and a Distributed Unit (DU). In the illustrated example of FIG. 7, the network architecture 700 includes a base station-CU 707, which may be a ground-based base station or a terrestrial base station. The regenerative payloads include an on-board base station DU, and is referred to herein as an NTN device-DU 702. The base station-CU 707 and the NTN device-DU 702, collectively, may correspond to the base station 310 in FIG. 3.

The NTN device-DU 702 communicates with the base station-CU 707 via the NTN gateway 504. The base station-CU 707 together with the NTN device-DU 702 perform functions, and may use internal communication protocols, which are similar to or the same as a gNB with a split architecture. In the example, the NTN device-DU 702 may correspond to and perform functions similar to or the same as a base station DU, while the base station-CU 707 may correspond to and perform functions similar to or the same as a base station CU. However, the base station-CU 707 and the NTN device-DU 702 may each include additional capability to support the UE 505 access using NTN devices.

The NTN device-DU 702 and the base station-CU 707 may communicate with one another using an F1 Application Protocol (F1AP), and together may perform some or all of the same functions as the base station 506 or the NTN device/base station 602 as described in connection with FIGS. 5 and 6, respectively.

The NTN device-DU 702 may terminate the radio interface and associated lower level radio interface protocols to the UE 505 and may transmit DL signals to the UE 505 and receive UL signals from the UE 505, which may include encoding and modulation of transmitted signals and demodulation and decoding of received signals. The operation of the NTN device-DU 702 may be partly controlled by the base station-CU 707. The NTN device-DU 702 may support one or more NR radio cells for the UE 505. The base station-CU 707 may also be split into separate control plane (CP) (base station-CU-CP) and user plane (UP) (base station-CU-UP) portions. The NTN device-DU 702 and the base station-CU 707 may communicate over an F1 interface to (a) support control plane signaling for the UE 505 using IP, Stream Control Transmission Protocol (SCTP) and F1 Application Protocol (F1AP) protocols, and (b) to support user plane data transfer for a UE using IP, User Datagram Protocol (UDP), PDCP, SDAP, GTP-U and User Plane protocols.

The base station-CU 707 may communicate with one or more other base station-CUs and/or with one more other terrestrial base stations using terrestrial links to support an Xn interface between any pair of base station-CUs and/or between the base station-CU 707 and any terrestrial base station.

The NTN device-DU 702 together with the base station-CU 707 may: (i) support signaling connections and voice and data bearers to the UE 505; (ii) support handover of the UE 505 between different radio cells for the NTN device-DU 702 and between different base station-DUs; and (iii) assist in the handover (or transfer) of NTN devices between different NTN gateways, different core networks, and between different countries. The base station-CU 707 may hide or obscure specific aspects of the NTN devices from the core network 510, e.g., by interfacing to the core network 510 in the same way or in a similar way to a terrestrial base station. The base station-CU 707 may further assist in sharing of NTN devices over multiple countries.

In the network architecture 700 of FIG. 7, the NTN device-DU 702 that communicates with and is accessible from an base station-CU may change over time with LEO devices. With the split base station architecture, the core network 510 may connect to NTN device-CUs that are fixed and that do not change over time, which may reduce difficulty with paging of the UE 505. For example, the core network 510 may not need to know which base station-DU is needed for paging the UE 505. The network architecture with regenerative payloads with a split base station architecture may thereby reduce the core network 510 impact at the expense of additional impact to the base station-CU 707.

Support of regenerative payloads with a split base station architecture, as shown in FIG. 7, may impact the network architecture 700 as follows. The impact to the core network 510 may be limited as for the transparent payloads (e.g., the NTN device 502) discussed above. For example, the core network 510 may treat a satellite RAT in the network architecture 700 as a new type of RAT with longer delay, reduced bandwidth and/or higher error rate. The impact on the NTN device-DU 702 may be less than the impact on NTN device/base stations (e.g., the NTN device/base station 602 with a non-split architecture), as discussed above in reference to FIG. 6. The NTN device-DU 702 may manage changing association with different (fixed) base station-CUs. Further, the NTN device-DU 702 may manage radio beams and radio cells. The base station-CU 707 impacts may be similar to the impact of the base station 506 for a network architecture with transparent payloads, as discussed above, except for extra impacts to manage changing associations with different NTN device-DUs and reduced impacts to support radio cells and radio beams, which may be transferred to the NTN device-DU 702.

Wireless communication between a UE and a base station may experience a propagation delay between the time, e.g., between the time that a UE transmits an uplink transmission and the time that the uplink transmission is received at the base station. In some aspects, different UEs experience different propagation delays, and that may cause time misalignment of the uplink transmissions from different UEs at the base station. Such misalignment, if large enough, may cause interferences among uplink transmissions, e.g., transmissions based on OFDM. The base station may provide the UE with a timing advance command that indicates for the UE to adjust the timing of uplink transmissions to compensate for the propagation delay. Thus, the network may use a timing advance command to control uplink signal transmission timing. The network may measure the time difference between uplink reception and the subframe time and may send a timing advance command to UE to change the timing of an uplink transmission, such as PUSCH, PUCCH, and/or SRS, to provide for reception at the base station that is better aligned with the subframe timing at the network side. For example, if the PUSCH/PUCCH/SRS arrives at the network too early, the network may indicate for the UE to transmit the signal later by an indicated amount. If the PUSCH/PUCCH/SRS arrives at the network too late, the network may indicate for the UE to transmit the uplink signal earlier by an indicated amount.

The timing advance ($T_{TA}$) applied by an UE communicating with an NTN may be based on:

$$T_{TA}=(N_{TA}+N_{TA,UE\text{-}specific}+N_{TA,Common}+N_{TA,offset})\times T_C$$

$N_{TA}$ is a cumulative timing advance value based on an accumulation of timing advance (TA) commands from the network. $N_{TA}=0$ for a PRACH transmission and is updated based on the TA Command field in random access msg2/msgB and/or in a MAC-CE TA command. The network provided timing advance may be referred to as a closed-loop timing advance.

$N_{TA,UE\text{-}specific}$ is a UE self-estimated timing advance amount that pre-compensates for a service link delay, e.g., a propagation delay between a UE and a satellite of the NTN. An example service link 414 is illustrated in FIG. 4. The UE may estimate this timing advance based on its location (e.g., GNSS) relative to a satellite of the NTN. The satellite location may be provided by an ephemeris. The timing advance calculated by the UE may be referred to as an open-loop timing advance.

$N_{TA,Common}$ is network-controlled common TA, and may include any timing offset considered necessary by the network. This common TA may be based on a delay at a feeder link, e.g., between a satellite and base station. FIG. 4 illustrates an example of a feeder link 412. In some aspects, the common TA may be zero.

$N_{TA,offset}$ is a fixed offset used to calculate the timing advance. In some aspects, $N_{TA,offset}$ may be used to ensure coexistence with LTE. Tc=1/(480000×4096) seconds.

The UE may apply the timing advance in an idle or inactive RRC state or in an RRC connected state. A UE may be in a connected state (e.g., an "RRC_CONNECTED" state) or an inactive state (e.g., an "RRC_INACTIVE" state) when the UE has established an RRC connection with a base station. If an RRC connection has not been established, the UE is in an idle state (e.g., an "RRC_IDLE" state). While in the idle state, the UE and the base station may establish an RRC connection and the UE may transition to the connected state. While in the connected state, the UE and/or base station may release the RRC connection and the UE may transition to the idle state. In other examples, while in the connected state, the UE and/or the base station may release with suspend the RRC connection and the UE may transition to the inactive state. While in the inactive state, the UE and/or the base station may resume the RRC connection and the UE may transmission to the connected state. In other examples, while in the inactive state, the UE and/or the base station may release the RRC connection and the UE may transition to the idle state.

In some aspects, the timing advance command from the network may become outdated, e.g., based on the amount of time since the TA command was received by the UE. In some aspects, the timing advance calculation may lead to a double adaptation in which a propagation delay is addressed by both the network controlled TA (e.g., the accumulated TA based on the TA commands from the network, $N_{TA}$) that attempts to mitigate the UE's use of a prior GNSS fix, which becomes duplicative when the UE performs a new GNSS fix and updates the self-estimated timing advance value $N_{TA,UE\text{-}specific}$. Double adaption may be also called a double correction.

Figure 8:
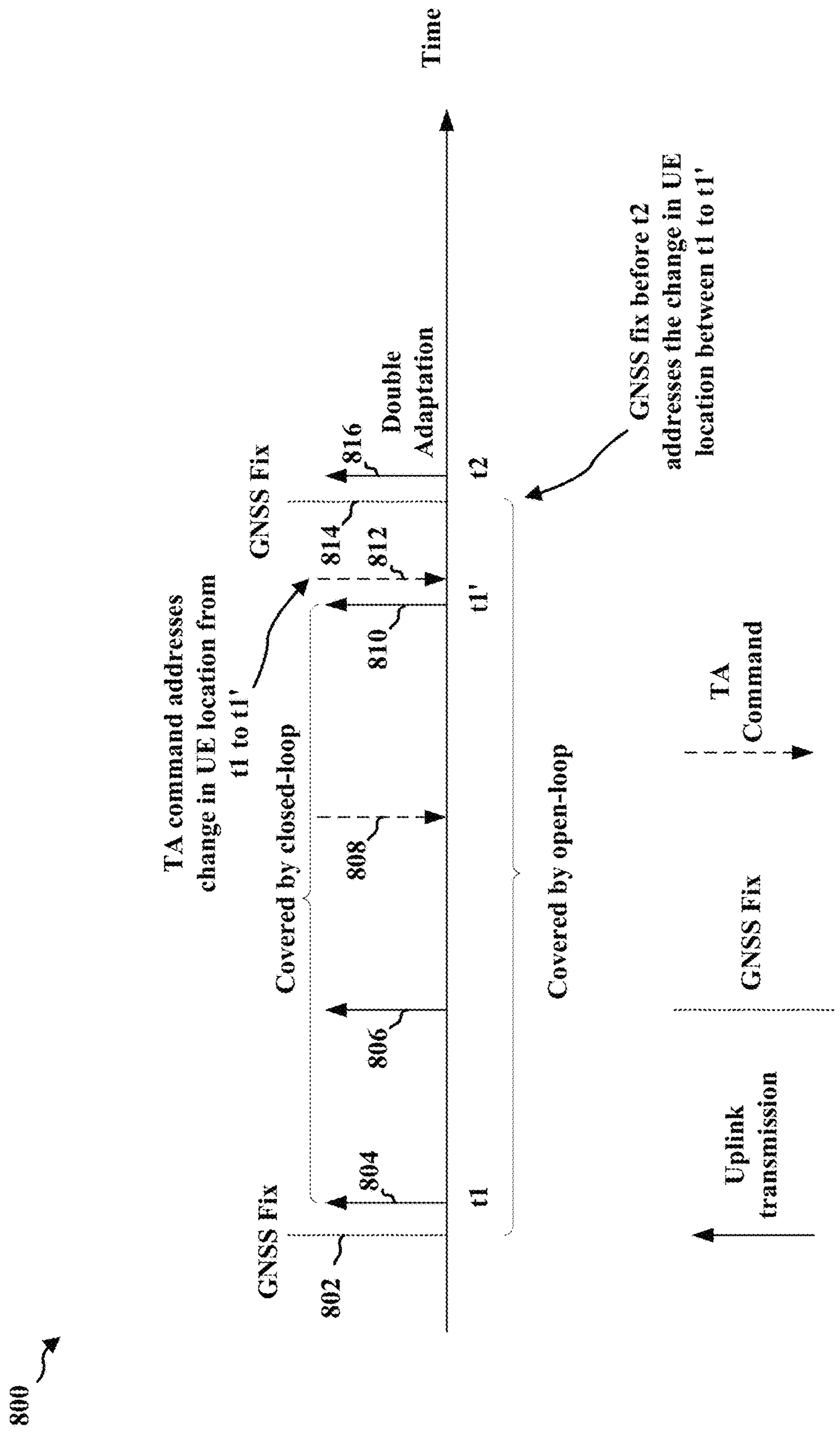
FIG. 8 illustrates a timing diagram illustrating example aspects of timing advance calculation in accordance with aspects presented herein.
Figure 9:
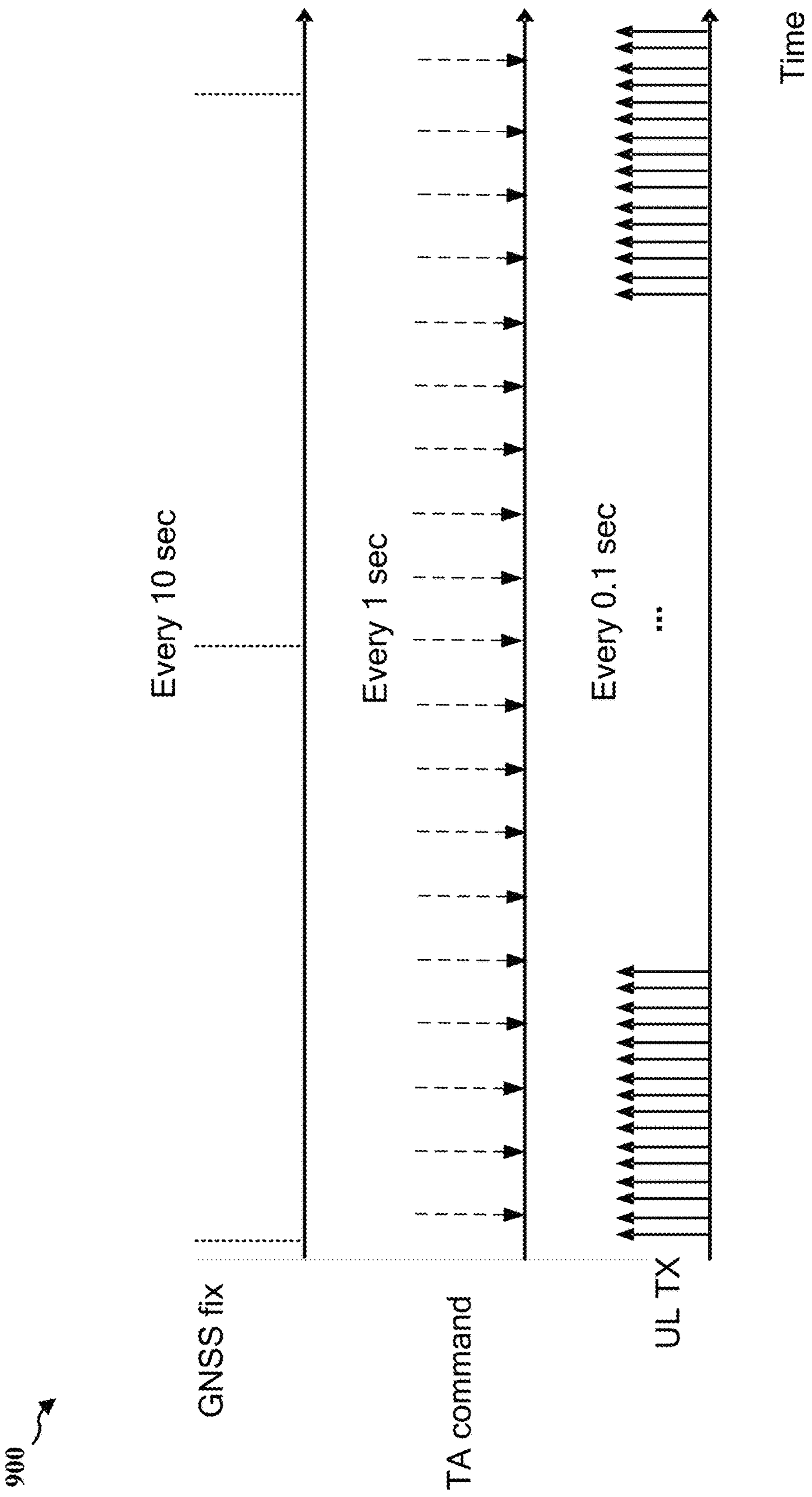
FIG. 9 illustrates a timing diagram illustrating example aspects of GNSS timing, timing advance (TA) command timing, and uplink transmission timing in accordance with aspects presented herein.

FIG. 8 illustrates a time diagram 800 that shows an example of a double adaptation for a timing advance. At 802, the UE performs a GNSS fix and uses the GNSS location reading resulting from the GNSS fix and the satellite location to determine $N_{TA,UE\text{-}specific}$. The UE transmits an uplink transmissions 804 at time t1 and 806 at time t1' based, at least in part, on the $N_{TA,UE\text{-}specific}$ for the GNSS fix 802. The uplink transmissions 804 and 806 may also have a timing advance based on accumulated timing advance commands (e.g., $N_{TA}$), $N_{TA,Common}$, and/or $N_{TA,Offset}$. The network provides a timing advance commands 808 and 812, based on the UE's prior transmissions. For example, the timing advance command 808 and/or 812 may be based on a propagation delay observed for uplink transmissions 804, 806, or 810 that are based on the GNSS fix 802. Thus, the timing advance commands 808 or 812 may address the movement of the UE relative to the satellite after the GNSS fix 802. The UE applies an accumulation of the timing advance commands 808, 812, etc. when transmitting uplink transmissions. For example, the transmission 804 and 806 may have a first value $N_{TA1}$, and the transmission 810 may have an accumulated value $N_{TA1}$+timing advance command 808. The transmission 816 may have an accumulated value $N_{TA1}$+timing advance command 808+timing advance command 812. The closed-loop timing advance based on the accumulated timing advance commands from the network provides a timing advance that addresses the movement of the UE relative to the satellite between GNSS fixes. The UE performs another GNSS fix at 814, and updates the self-estimated timing advance (e.g., open-loop timing advance value) $N_{TA,UE\text{-}specific}$ based on the UE's location relative to the satellite based on the GNSS fix 814. Thus, the self-estimated timing advance $N_{TA,UE\text{-}specific}$ also addresses the UE's movement between the GNSS fixes 802 and 814. The addition of the accumulated $N_{TA}+N_{TA,UE\text{-}specific}$ provides for a double adaptation (which may be also called double correction) based on the UE's movement relative to the satellite. As time t2, when the uplink transmission 816 is transmitted, is close to time t1' when the uplink transmission 810 is transmitted and to the GNSS fix, the self-estimated timing advance ($N_{TA,UE\text{-}specific}$) based on the GNSS fix 814 captures the change in location between t1 and t1' in addition to the timing advance commands 808, 812 from the network that address the change in location. FIG. 9 illustrates an example time diagram 900 showing an example of the time periods between GNSS fixes, timing commands from the network, and uplink transmissions.

Figure 10A:
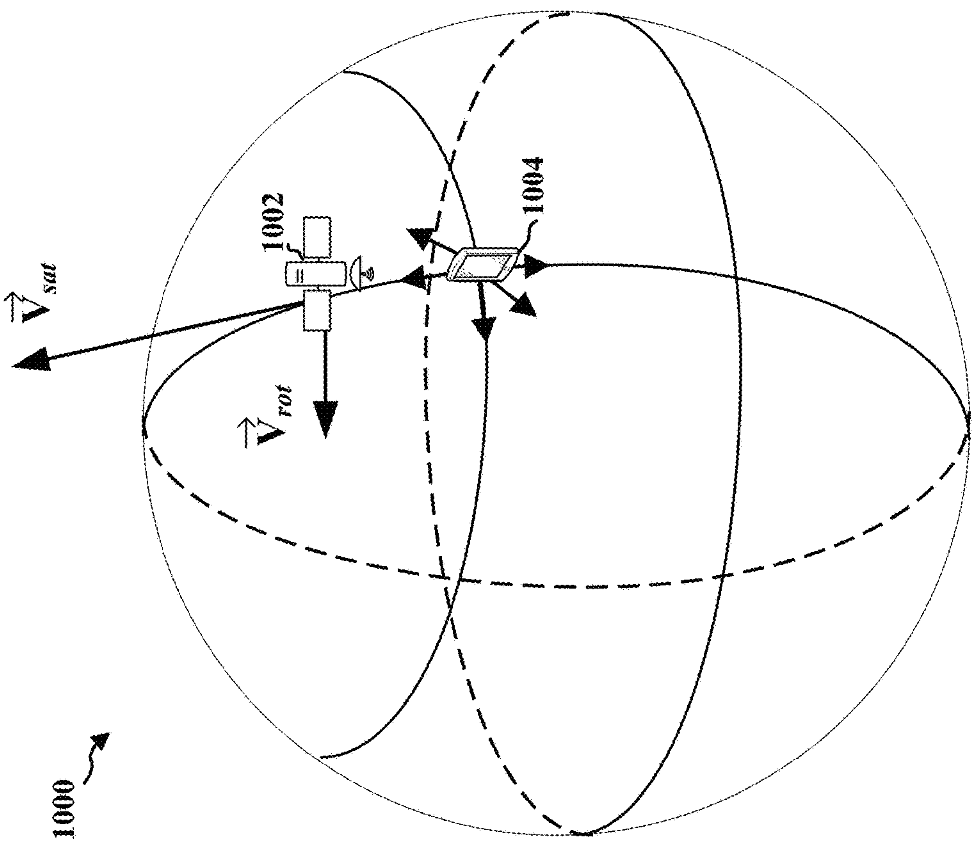
FIGS. 10A and 10B illustrate example aspects of UE motion relative to a satellite in accordance with aspects presented herein.
Figure 10B:
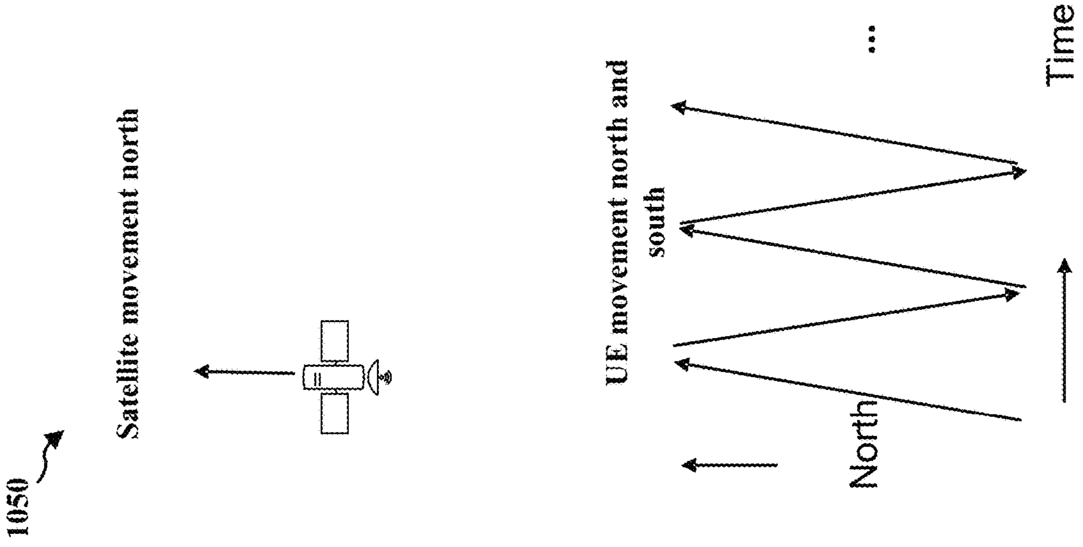

FIG. 10A illustrates an example diagram 1000 showing the potential for movement at the UE 1004 and movement of a satellite 1002 relative to the UE 1004. As the satellite 1002 orbits the earth, the UE's location relative to the satellite may change even if the UE 1004 does not move. In addition, the UE 1004 may be mobile and may change locations. The combination of the movement of the UE 1004 and the satellite 1002 orbit may cause a change in a propagation delay between the UE 1004 and the satellite 1002. FIG. 10B illustrates an example 1050 in which the satellite may move in a direction, such as north in FIG. 10B, and the UE may have a pattern of movement, such as back and forth in a north-south direction.

Figure 11:
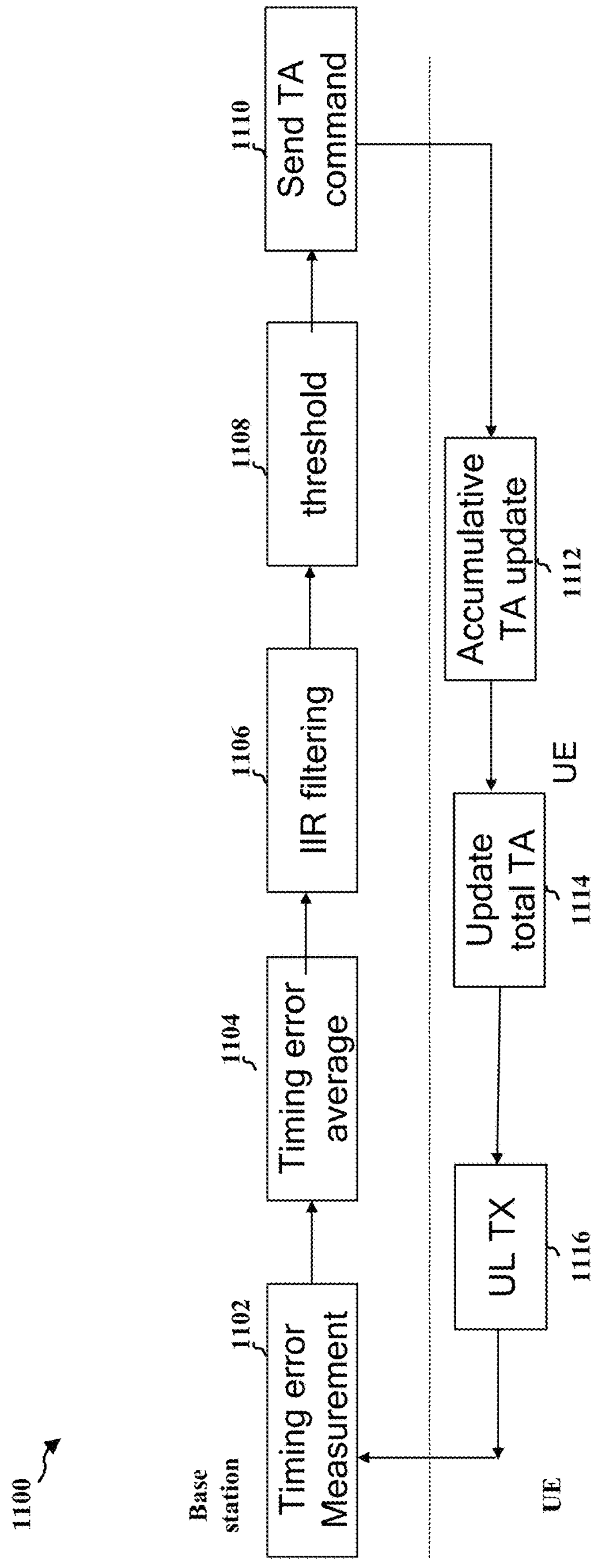
FIG. 11 illustrate example aspects performed by a base station and UE for a timing advance calculation in accordance with aspects presented herein.

FIG. 11 illustrates an example of a closed-loop timing advance aspects 1100, including aspects performed at the UE and at the base station to provide a timing advance for a UE for uplink transmissions to an NTN. At 1102, the network measures a timing error for an uplink transmission received from the UE. At 1104, the network may average multiple timing error measurements for the UE, e.g., multiple uplink transmissions received within a period of time. The network may filter the average error measurement, at 1106. In some aspects, the network may apply a timing advance threshold at 1108, e.g., and limit the timing advance command to a threshold timing advance. As one, non-limiting example, the timing advance threshold may be 0.1 μs. At 1110, the network may transmit the timing advance command to the UE. The UE may add the timing advance command to an accumulated timing advance value, e.g., $N_{TA}$, at 1112. The UE may update the total TA, at 1114, which may include other factors beyond the accumulated timing advance command. For example, the total timing advance, at 1114, may further include any of $N_{TA,UE\text{-}specific}$, $N_{TA,Common}$, or $N_{TA,offset}$. Then, at 1116, the UE may transmit an uplink transmission at a timing based on the total timing advance calculated at 1114. The process may continue, and the network may perform a timing error measurement, e.g., at 1102, based on the uplink transmission 1116.

Aspects presented herein provide mechanisms for the UE to apply a more accurate timing advance and to avoid double adaptation (i.e., double correction). In some aspects, the UE may reset a network controlled timing advance $N_{TA}$, e.g., accumulated from TA commands, in response to a GNSS fix.

Figure 12:
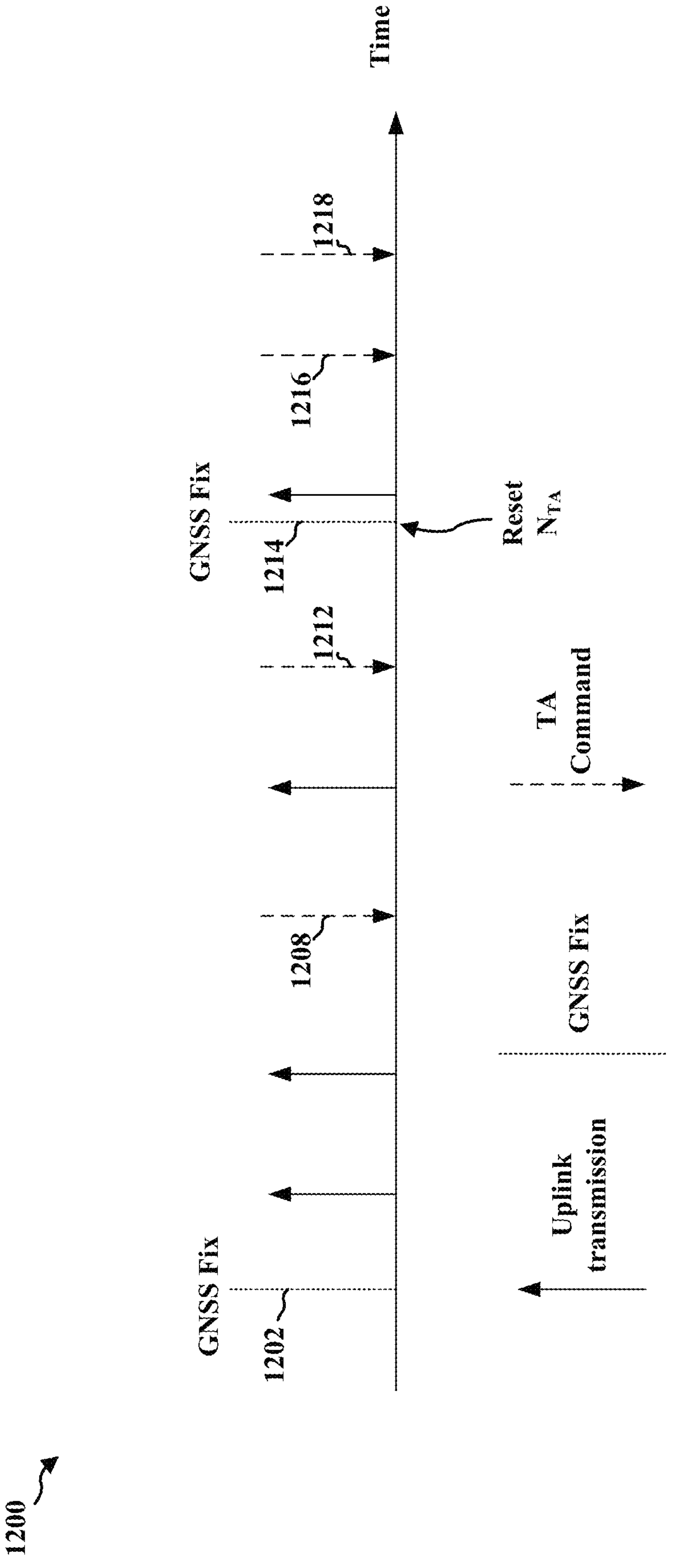
FIG. 12 illustrates a timing diagram illustrating example aspects of timing advance calculation in accordance with aspects presented herein.

In calculating the timing advance to be applied to an uplink transmission, after a UE performs a GNSS fix, the UE may ignore and/or reset the network-controlled TA (e.g., set $N_{TA}$ to 0), and then may resume the accumulation of the network-controlled TA commands after the GNSS fix. FIG. 12 illustrates an example time diagram 1200 showing a GNSS fix 1202 and 1214. The UE may accumulate TA commands 1208 and 1212 for the accumulated timing advance command $N_{TA}$, so that before the GNSS fix 1214, $N_{TA}$ includes 1208+1210. In response to the GNSS fix 1214, the UE may reset $N_{TA}$ and may begin to accumulate later TA commands 1216, 1218. In some aspects, the UE may reset $N_{TA}$ to zero or to an initial value at each GNSS fix. In some aspects, the UE may reset $N_{TA}$ to a value at the prior GNSS fix. For example, in response to the GNSS fix 1214, the UE may reset $N_{TA}$ to the value at the time of the GNSS fix 1202 and may begin to accumulate later TA commands 1216, 1218.

The reset may be unconditional, or may depend on a condition. As an example, the UE may reset the network-controlled TA accumulated (e.g., $N_{TA}$) between the last GNSS fix (e.g., 1202) and the most recent GNSS fix (e.g., 1214) if $N_{TA}$ has the same sign as the change in the UE self-estimated TA ($N_{TA,UE\text{-}specific}$) based on the latest GNSS fix (e.g., 1214). In some aspects, the UE may reset the network-controlled TA (e.g., $N_{TA}$) when a timer expires.

Figure 14:
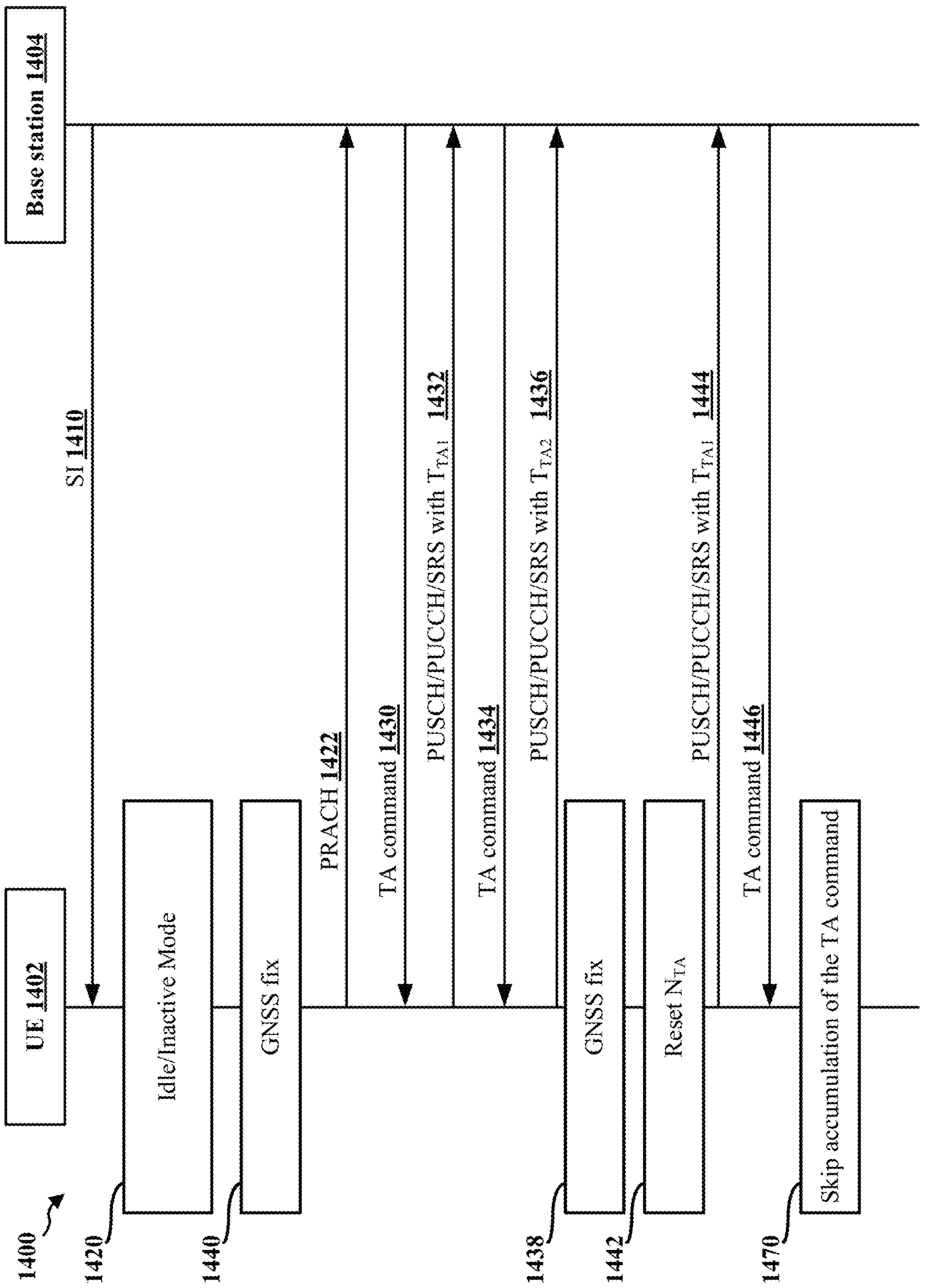
FIG. 14 is a communication flow between a UE and a base station in accordance with aspects presented herein

FIG. 14 illustrates an example communication flow 1400 between a UE 1402 and a base station 1404, e.g., in an NTN. The UE may be in an RRC idle mode or an RRC inactive mode at 1420. The UE may receive system information 1410 from the base station 1404. The UE 1402 may determine its location from a GNSS fix 1440. The UE 1402 may transmit a PRACH transmission 1422 (e.g., such as a random access Msg 1 or Msg A) to the base station 1404. The PRACH transmission 1422 may be transmitted at a time based on $N_{TA}=0$. Following the PRACH transmission 1422, the UE may receive a TA command 1430. The UE may update $N_{TA}$ based on the TA command 1430, and may calculate a timing advance for an uplink transmission 1432 based on an accumulation of TA commands ($N_{TA}$) and a self-estimated timing advance ($N_{TA,UE\text{-}specific}$). The TA command 1430 may be carried in a random access response (RAR) message or in a TA MAC CE. In some aspects, the UE 1402 may transmit the uplink transmission 1432 with a timing advance (e.g., a total timing advance $T_{TA}$) based on:

$$T_{TA}=(N_{TA}+N_{TA,UE\text{-}specific}+N_{TA,Common}+N_{TA,offset})\times T_C$$

The UE 1402 may receive one or more additional TA commands 1434 and may accumulate the one or more additional TA commands to determine a timing advance (e.g., a total timing advance $T_{TA}$) for one or more additional uplink transmissions 1436. At 1438, the UE 1402 may obtain a GNSS fix. The UE may reset the accumulated TA commands ($N_{TA}$), at 1442, based on the GNSS fix 1438, e.g., as described in connection with FIG. 12. The UE 1402 may reset the accumulated TA commands ($N_{TA}$), at 1442, based on the expiration of a timer, in some aspects. The UE 1402 may transmit an uplink transmission 1444 having a total timing advance $T_{TA}$ based on the reset $N_{TA}$.

In some aspects, a UE may ignore a TA command from the network based on one or more conditions. As an example, in FIG. 14, the UE 1402 may receive the TA command 1446, and may skip accumulation of the TA command 1446, at 1470, based on a condition being met. In some aspects, the UE may skip accumulation of a TA command into $N_{TA}$ if the propagation delay (between the UE and the network) has changed more than a threshold since the UE's latest uplink transmission. The propagation delay may be derived based on observing the change in the downlink timing of reception of downlink signals at the UE. For example, the UE may determine not to accumulate the TA command 1208 if the propagation delay has changed by more than the threshold amount of time. The UE may accumulate the TA command 1212 if the propagation delay change is less than the threshold.

In some aspects, the UE may skip accumulation of a TA command into $N_{TA}$ if the GNSS location of the UE has changed by more than a threshold amount since the UE's latest uplink transmission. The change in the GNSS location may be derived based on observing the change in the downlink timing in some aspects.

In some aspects, the UE may skip accumulation of a TA command into $N_{TA}$ if the time between the TA command reception and the UE's latest uplink transmission is more than a threshold. The threshold may be more than one round trip time (RTT) estimated before the TA command arrival.

In some aspects, the UE may skip accumulation of a TA command into $N_{TA}$ if the TA in the TA command has the same sign as the change in the UE self-estimated TA ($N_{TA,UE\text{-}specific}$).

If the UE receives a TA command and does not accumulate the TA command based on a condition being met, the UE may restart a timer, such as the time alignment timer (e.g., which may be referred to as a TimeAlignmentTimer).

In some aspects, after a UE performs a GNSS fix, the UE may calculate the total timing advance for an uplink transmission by filtering, limiting, and/or clipping the GNSS reading resulting from the latest GNSS fix and prior GNSS readings. The UE may then update its self-estimated TA (e.g., the open-loop TA or $N_{TA,UE\text{-}specific}$).

As an example, the GNSS filtering output (e.g., filtered_GNSS(k+1)) may be calculated as:

$$\text{filtered\_GNSS}(k+1)=(1-\alpha)*\text{filtered\_GNSS}(k)+\alpha*\text{GNSS}(k+1)$$

GNSS(k) represents the Cartesian coordinates of the UE location calculated from the GNSS reading at time k. The parameter $\alpha$ represents how much weight is put on GNSS (k+1).

In some aspects, when calculating the open-loop TA (self-estimated TA $N_{TA,UE\text{-}specific}$) in an RRC connected mode, the UE may apply the GNSS location obtained from a most recent Idle mode. By applying the GNSS location from the most recent idle mode, the UE avoids duplicating a timing advance due to a change of location that has already been addressed by the accumulation of network TA commands in $N_{TA}$.

In some aspects, when calculating the open-loop TA (self-estimated TA $N_{TA,UE\text{-}specific}$), the UE uses the last GNSS location before the first TA command is received until the UE enters an RRC-Idle/Inactive state or has not received a TA command for a threshold amount of time.

In some aspects, when calculating the open-loop TA (self-estimated TA $N_{TA,UE\text{-}specific}$), the UE uses the last GNSS location before the first TA command is received until the UE performs random access (e.g., transmitting a PRACH preamble) or hasn't received a TA command for a threshold amount of time. The UE may perform random access while in the RRC-Connected state due to procedures such as beam failure recovery, handover, PDCCH order or scheduling request failure.

In some aspects, the UE may apply slew rate control to the total timing advance $T_{TA}$ that is calculated based on network-controlled TA ($N_{TA}$) and UE self-estimated TA ($N_{TA,UE\text{-}specific}$), based on one or more rules or conditions. As an example, the UE may consider a maximum amount of the magnitude of the timing change in one adjustment. If $T_{TA}$ is beyond the maximum amount (e.g., a threshold amount of time), the UE may refrain from applying the timing advance or may adjust the timing advance. The UE may apply a minimum aggregate adjustment rate, that indicates a minimum timing adjustment for a period of time (e.g., per second) and/or a maximum aggregate adjustment rate that indicates a maximum adjustment for a period of time (e.g., per second). The maximum and minimum adjustment rates may provide an adjustment range for the magnitude of the $T_{TA}$ that may be applied by the UE. If the total timing advance is outside the range, the UE may skip application of the timing advance or may otherwise adjust the timing advance.

The thresholds may depend on any of the subcarrier spacing, satellite type (e.g., LEO vs GEO), a satellite orbit, GNSS accuracy, or the satellite lookup angle. The satellite lookup angle may refer to an angle between the UE and the satellite relative to the horizon.

In some aspects, when calculating the UE self-estimated TA ($N_{TA,UE\text{-}specific}$), the UE may apply filtering, clipping or limiting. In some aspects, the UE may also apply slew rate control, in a way similar to the slew rate control for the total timing advance $T_{TA}$ described above. The set of thresholds may be different from the set of thresholds used therein.

Figure 13:
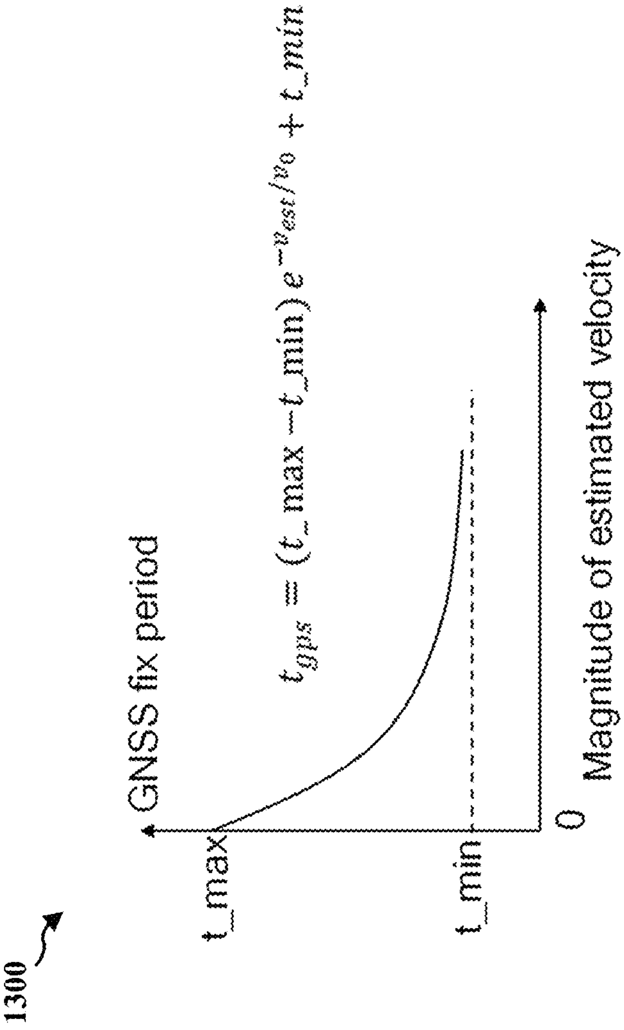
FIG. 13 illustrates a timing diagram illustrating an example of a GNSS period that relates to a velocity of the UE in accordance with aspects presented herein.

In some aspects, the UE may adapt the time gap between adjacent GNSS fixes based on a velocity of the UE. The adaptation may be based on an estimate of the UE velocity. The estimate may be based on past GNSS readings and the time gaps between the GNSS readings, inertial sensor readings, or a combination of the two. The UE may decrease a time gap between adjacent GNSS fixes in response to an increase in a velocity of the UE. The UE may increase a time gap between adjacent GNSS fixes in response to a decrease in the UE's velocity. FIG. 13 illustrates an example graph 1300 showing an example formula for adjusting the time between GNSS fixes based on the estimated velocity (Vest) of the UE. $v_0$ is a parameter to control the decay.

The decrease in the time period between GNSS fixes may improve the accuracy of the total timing advance as the velocity of the UE increases. The increase in the time period between GNSS fixes for a UE with a lower velocity may improve power savings for a UE that is moving more slowly and has a reduced change in a propagation delay.

Figure 15:
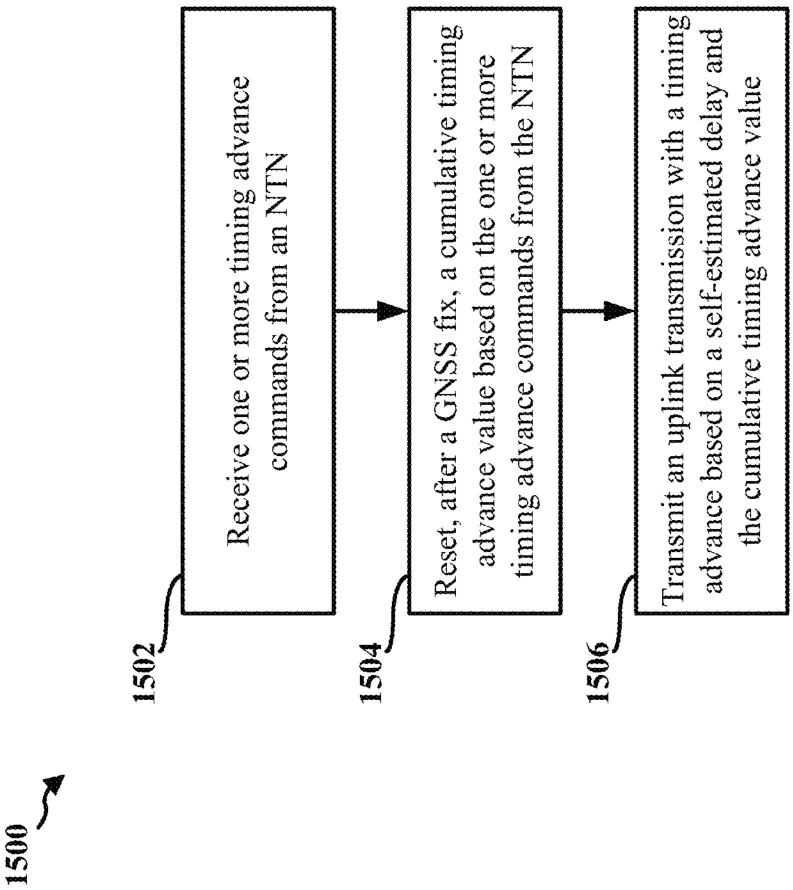
FIG. 15 is a flowchart of a method of wireless communication in accordance with aspects presented herein

FIG. 15 is a flowchart 1500 of a method of wireless communication. The method may be performed by a UE (e.g., the UE 104, 350, 430, 505, 1004, 1402; the apparatus 1702). The method may improve timing advance for uplink transmissions at a UE.

At 1502, the UE receives one or more timing advance commands from an NTN. FIG. 12 and FIG. 14 illustrate examples of a UE receiving TA commands from a network. FIGS. 4-7 illustrate examples of NTNs. The reception may be performed, e.g., by the TA command component 1742 of the apparatus 1702 in FIG. 17. The TA command may be based on the network measurement of an uplink transmission from the UE. The TA command may include a network control to adjust for a propagation delay between a UE and a satellite.

At 1504, the UE resets, after a GNSS fix, a cumulative timing advance value (e.g., $N_{TA}$) based on the one or more timing advance commands from the NTN. The reset may be performed, e.g., by the TA command component 1742 of the apparatus 1702 in FIG. 17. In some aspects, the GNSS fix may be based on a GNSS time period associated with a velocity of the UE. The velocity of the UE may be based on at least one of a difference between GNSS readings or inertial sensor readings. FIG. 13 illustrates an example of the change in GNSS period relative to a velocity of the UE. FIGS. 12 and 14 illustrate examples of a UE resetting the cumulative timing advance value. The UE may reset the cumulative timing advance value to zero in response to the GNSS fix. The UE may then add to the cumulative timing advance value, at least one additional timing advance from at least one additional timing advance command after the GNSS fix. The UE may reset the cumulative timing advance value, in response to the GNSS fix, to remove an accumulated amount between the GNSS fix and a prior GNSS fix. The UE may then add, to the cumulative timing advance value, at least one additional timing advance from at least one additional timing advance command after the GNSS fix. The UE may reset the cumulative timing advance value in response to expiration of a timer.

At 1506, the UE transmits an uplink transmission with a timing advance based on a self-estimated delay and the cumulative timing advance value. The transmission may be performed, e.g., by the transmission component 1734 of the apparatus 1702 based on a timing advance value (e.g., $T_{TA}$) from the timing advance component 1746. The timing advance with which the uplink transmission is transmitted, at 1506, may be further based on a threshold metric including one or more of: a maximum amount of a magnitude of a timing change in one adjustment, a minimum aggregate adjustment rate, or a maximum aggregate adjustment rate. The threshold metric may be based on at least one of a subcarrier spacing, a satellite type, a satellite orbit, a GNSS accuracy, a look up table associated with a satellite.

In some aspects, the UE may skip accumulation of a timing advance command to the cumulative timing advance value based on one or more of: a propagation delay change that meets a delay threshold value, a GNSS location change that meets a location change threshold value, a time difference between reception of the timing advance command and a last uplink transmission being more than a timing threshold value, or the timing advance command indicating a same sign of positive or negative change as the self-estimated delay. The skipping may be performed, e.g., by the timing advance component 1746 of the apparatus 1702 in FIG. 17. The UE may restart a time alignment timer in response to skipping the accumulation of the timing advance command to the cumulative timing advance value.

Figure 16:
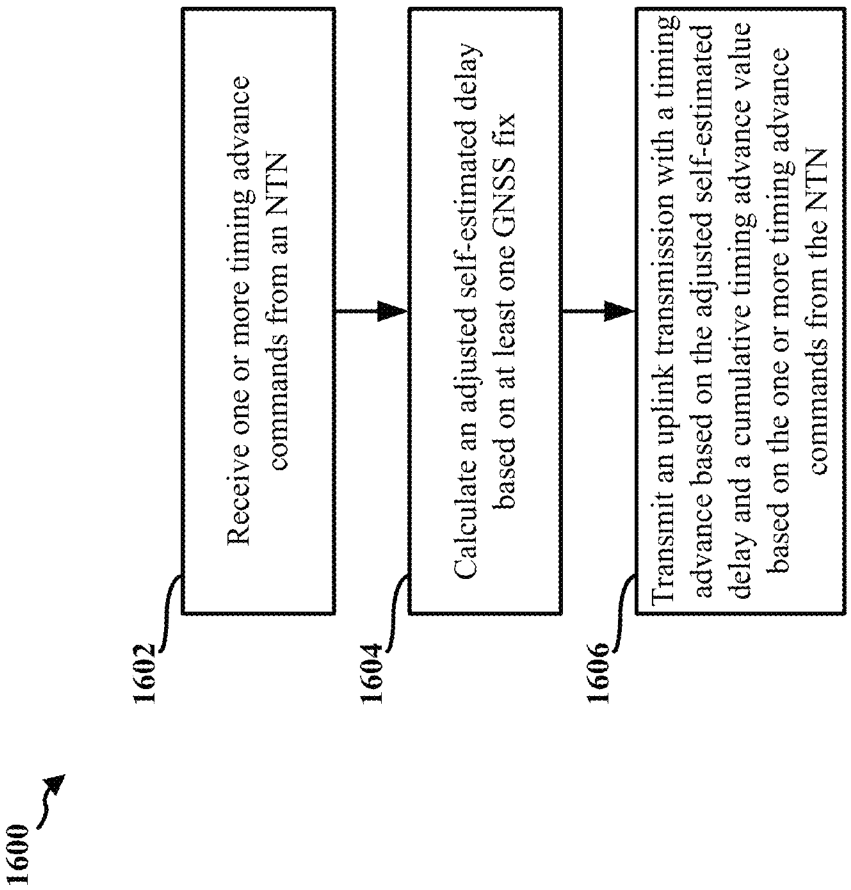
FIG. 16 is a flowchart of a method of wireless communication in accordance with aspects presented herein

FIG. 16 is a flowchart 1600 of a method of wireless communication. The method may be performed by a UE (e.g., the UE 104, 350, 430, 505, 1004, 1402; the apparatus 1702). The method may improve timing advance for uplink transmissions at a UE.

At 1602, the UE receives one or more timing advance commands from an NTN. FIG. 12 and FIG. 14 illustrate examples of a UE receiving TA commands from a network. FIGS. 4-7 illustrate examples of NTNs. The reception may be performed, e.g., by the TA command component 1742 of the apparatus 1702 in FIG. 17. The TA command may be based on the network measurement of an uplink transmission from the UE. The TA command may include a network control to adjust for a propagation delay between a UE and a satellite.

At 1604, the UE calculates an adjusted self-estimated delay (e.g., $N_{TA,UE\text{-}specific}$) based on at least one GNSS fix. The UE may determine a location of the UE relative to a satellite and may calculate $N_{TA,UE\text{-}specific}$ as a propagation delay based on the distance between the UE and the satellite. The calculation may be performed, e.g., by the self-estimated TA component 1744 of the apparatus 1702 in FIG. 17. The adjusted self-estimated delay may be a function of at least a current GNSS fix and a prior GNSS fix. The adjusted self-estimated delay may be based on a last GNSS location from a most recent RRC idle mode. For example, the adjusted self-estimated delay may include aspects described in connection with FIG. 12 or FIG. 14. The adjusted self-estimated delay may be based on a last GNSS location before a first TA command is received until the UE enters an RRC-Idle/Inactive state or has not received a TA command for a threshold amount of time. The adjusted self-estimated delay may be based on a last GNSS location before a first TA command is received until the UE performs random access or has not received a TA command for a threshold amount of time.

At 1606, the UE transmits an uplink transmission with a timing advance based on the adjusted self-estimated delay and a cumulative timing advance value based on the one or more timing advance commands from the NTN. The transmission may be performed, e.g., by the transmission component 1734 of the apparatus 1702 based on a timing advance value (e.g., $T_{TA}$) from the timing advance component 1746. The timing advance with which the uplink transmission is transmitted, at 1506, may be further based on a threshold metric including one or more of: a maximum amount of a magnitude of a timing change in one adjustment, a minimum aggregate adjustment rate, or a maximum aggregate adjustment rate. The threshold metric may be based on at least one of a subcarrier spacing, a satellite type, a satellite orbit, a GNSS accuracy, a look up table associated with a satellite.

In some aspects, the GNSS fix may be based on a GNSS time period associated with a velocity of the UE. The velocity of the UE may be based on at least one of a difference between GNSS readings or inertial sensor readings. FIG. 13 illustrates an example of the change in GNSS period relative to a velocity of the UE.

The UE may perform slew rate control of a total timing advance that is calculated based on the adjusted self-estimated delay and the cumulative timing advance value, the slew rate control being based on one or more rules or conditions.

Figure 17:
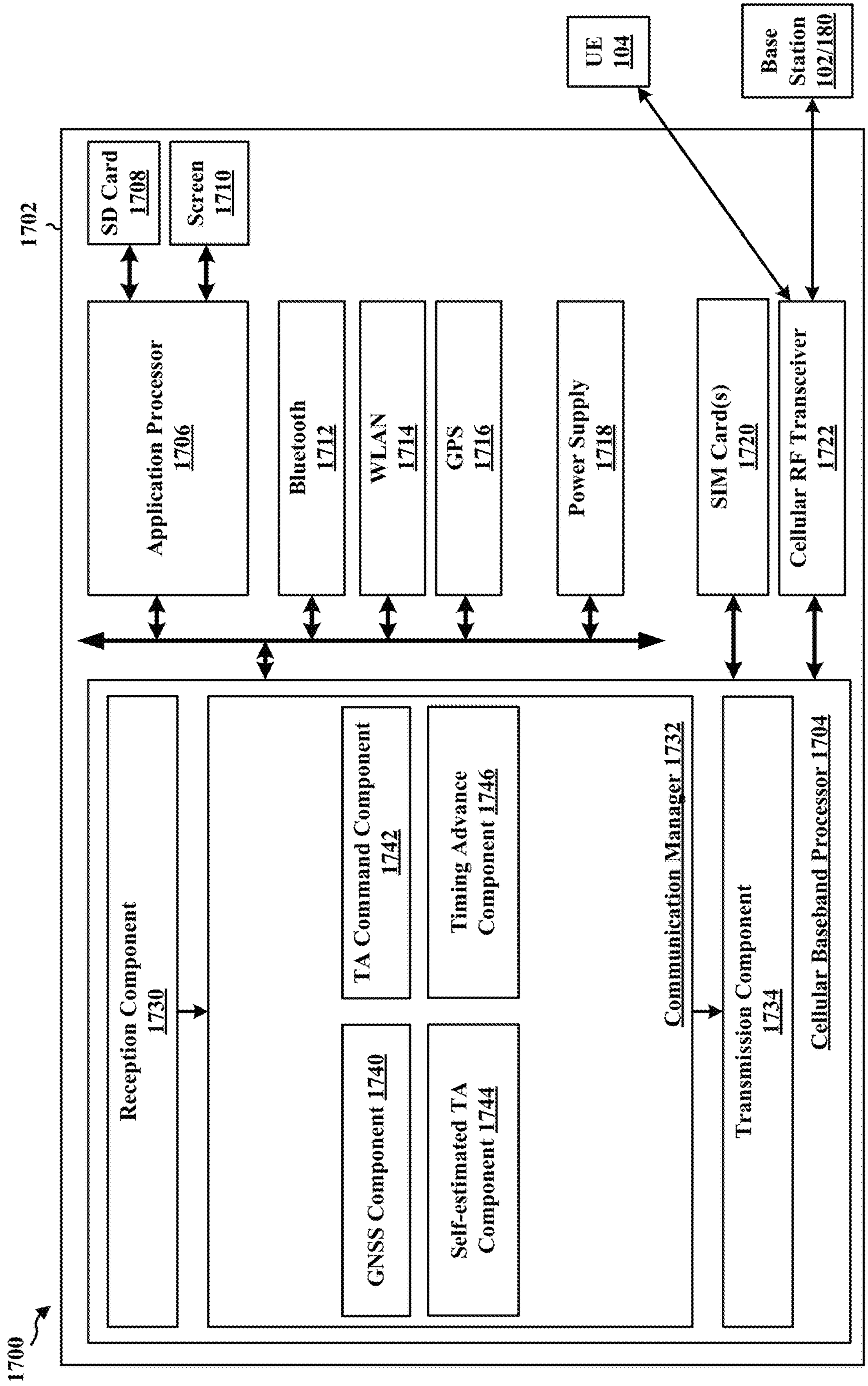
FIG. 17 is a diagram illustrating an example of a hardware implementation for an example apparatus in accordance with aspects presented herein.

FIG. 17 is a diagram 1700 illustrating an example of a hardware implementation for an apparatus 1702. The apparatus 1702 may be a UE, a component of a UE, or may implement UE functionality. In some aspects, the apparatus 1702 may include a cellular baseband processor 1704 (also referred to as a modem) coupled to a cellular RF transceiver 1722. In some aspects, the apparatus 1702 may further include one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, or a power supply 1718. The cellular baseband processor 1704 communicates through the cellular RF transceiver 1722 with the UE 104 and/or BS 102/180. The cellular baseband processor 1704 may include a computer-readable medium/memory. The computer-readable medium/memory may be non-transitory. The cellular baseband processor 1704 is responsible for general processing, including the execution of software stored on the computer-readable medium/memory. The software, when executed by the cellular baseband processor 1704, causes the cellular baseband processor 1704 to perform the various functions described supra. The computer-readable medium/memory may also be used for storing data that is manipulated by the cellular baseband processor 1704 when executing software. The cellular baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the cellular baseband processor 1704. The cellular baseband processor 1704 may be a component of the UE 350 and may include the memory 360 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire UE (e.g., sec 350 of FIG. 3) and include the additional modules of the apparatus 1702.

The communication manager 1732 includes a GNSS component 1740 that is configured to receive a GNSS fix. The communication manager 1732 further includes a TA command component 1742 that is configured to receive one or more timing advance commands from an NTN, e.g., as described in connection with 1502 and/or 1602 in FIG. 15 or 16. The TA command component 1742 may be configured to reset, after a GNSS fix, a cumulative timing advance value based on the one or more timing advance commands from the NTN, e.g., as described in connection with 1504 in FIG. 15. The communication manager 1732 further includes a self-estimated TA component 1744 that receives input in the form of the GNSS fix from the GNSS component 1740 and that calculates a self-estimated delay based on the at least one GNSS fix. In some aspects, the self-estimated TA component 1744 may be configured to calculate an adjusted self-estimated delay, e.g., as described in connection with 1604 in FIG. 16. The communication manager 1732 further includes a timing advance component 1746 that is configured to determine a total timing advance and to transmit an uplink transmission with a timing advance based on a self-estimated delay and the cumulative timing advance value, e.g., as in 1506 in FIG. 15, and/or transmit an uplink transmission with a timing advance based on the adjusted self-estimated delay and a cumulative timing advance value based on the one or more timing advance commands from the NTN, e.g., as described in connection with 1606 in FIG. 16.

The apparatus may include additional components that perform each of the blocks of the algorithm in the flowcharts of FIGS. 15, 16, and/or the aspects performed by the UE in FIG. 14. As such, each block in the flowcharts of FIGS. 15, 16, and/or the aspects performed by the UE in FIG. 14, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the cellular baseband processor 1704, includes means for receiving one or more timing advance commands from an NTN. The apparatus 1702 may include means for resetting, after a GNSS fix, a cumulative timing advance value based on the one or more timing advance commands from the NTN and means for an uplink transmission with a timing advance based on a self-estimated delay and the cumulative timing advance value. The apparatus 1702 may further include means for adding, to the cumulative timing advance value, at least one additional timing advance from at least one additional timing advance command after the GNSS fix. The apparatus 1702 may further include means for adding, to the cumulative timing advance value, at least one additional timing advance from at least one additional timing advance command after the GNSS fix. The apparatus 1702 may further include means for skipping accumulation of a timing advance command to the cumulative timing advance value based on one or more conditions. The apparatus 1702 may further include means for restarting a time alignment timer in response to skipping the accumulation of the timing advance command to the cumulative timing advance value. The apparatus 1702 may include means for receiving one or more timing advance commands from an NTN, means for calculating an adjusted self-estimated delay based on at least one GNSS fix, and means for transmitting an uplink transmission with a timing advance based on the adjusted self-estimated delay and a cumulative timing advance value based on the one or more timing advance commands from the NTN. The means may be one or more of the components of the apparatus 1702 configured to perform the functions recited by the means. As described supra, the apparatus 1702 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: receiving one or more timing advance commands from a NTN; resetting, after a GNSS fix, a cumulative timing advance value based on the one or more timing advance commands from the NTN; and transmitting an uplink transmission with a timing advance based on a self-estimated delay and the cumulative timing advance value.

In aspect 2, the method of aspect 1 further includes that the UE resets the cumulative timing advance value to zero in response to the GNSS fix, the method further comprising: adding, to the cumulative timing advance value, at least one additional timing advance from at least one additional timing advance command after the GNSS fix.

In aspect 3, the method of aspect 1 further includes that the UE resets the cumulative timing advance value, in response to the GNSS fix, to remove an accumulated amount between the GNSS fix and a prior GNSS fix, the method further comprising: adding, to the cumulative timing advance value, at least one additional timing advance from at least one additional timing advance command after the GNSS fix.

In aspect 4, the method of aspect 1 further includes that the UE resets the cumulative timing advance value in response to expiration of a timer.

In aspect 5, the method of any of aspects 1-4 further includes that skipping accumulation of a timing advance command to the cumulative timing advance value based on one or more of: a propagation delay change that meets a delay threshold value, a GNSS location change that meets a location change threshold value, a time difference between reception of the timing advance command and a last uplink transmission being more than a timing threshold value, or the timing advance command indicating a same sign of positive or negative change as the self-estimated delay.

In aspect 6, the method of aspect 5 further includes restarting a time alignment timer in response to skipping the accumulation of the timing advance command to the cumulative timing advance value.

In aspect 7, the method of any of aspects 1-6 further includes that the timing advance with which the uplink transmission is transmitted is further based on a threshold metric including one or more of: a maximum amount of a magnitude of a timing change in one adjustment, a minimum aggregate adjustment rate, or a maximum aggregate adjustment rate.

In aspect 8, the method of aspect 7 further includes that the threshold metric is based on at least one of a subcarrier spacing, a satellite type, a satellite orbit, a GNSS accuracy, a look up table associated with a satellite.

In aspect 9, the method of any of aspects 1-8 further includes that the GNSS fix is based on a GNSS time period associated with a velocity of the UE.

In aspect 10, the method of aspect 9 further includes that the velocity of the UE is based on at least one of a difference between GNSS readings or inertial sensor readings.

Aspect 11 is an apparatus comprising memory and at least one processor, the memory and the at least one processor are configured to perform the method of any of aspects 1-10.

In aspect 12, the apparatus of aspect 11 further comprises: at least one antenna and a transceiver coupled to the at least one antenna and the at least one processor.

Aspect 13 is an apparatus including means for implementing a method or realizing an apparatus as in any of aspects 1-10.

In aspect 14, the system or apparatus of aspect 13 further comprises: at least one antenna and a transceiver coupled to the at least one antenna.

Aspect 15 is a non-transitory computer readable medium storing instructions executable by one or more processors to cause the one or more processors to implement a method as in any of aspects 1-10.

Aspect 16 is a method of wireless communication at a UE, comprising: receiving one or more timing advance commands from a NTN; calculating an adjusted self-estimated delay based on at least one GNSS fix; and transmitting an uplink transmission with a timing advance based on the adjusted self-estimated delay and a cumulative timing advance value based on the one or more timing advance commands from the NTN.

In aspect 17, the method of aspect 16 further includes that the adjusted self-estimated delay is a function of at least a current GNSS fix and a prior GNSS fix.

In aspect 18, the method of aspect 16 further includes that the adjusted self-estimated delay is based on a last GNSS location from a most recent RRC idle mode.

In aspect 19, the method of aspect 16 further includes that the adjusted self-estimated delay is based on a last GNSS location before a first TA command is received until the UE enters an RRC-Idle/Inactive state or has not received a TA command for a threshold amount of time.

In aspect 20, the method of aspect 16 further includes that the adjusted self-estimated delay is based on a last GNSS location before a first TA command is received until the UE performs random access or has not received a TA command for a threshold amount of time.

In aspect 21, the method of any of aspects 16-20 further includes that the timing advance with which the uplink transmission is transmitted is further based on a threshold metric including one or more of: a maximum amount of a magnitude of a timing change in one adjustment, a minimum aggregate adjustment rate, or a maximum aggregate adjustment rate.

In aspect 22, the method of aspect 21 further includes that the threshold metric is based on at least one of a subcarrier spacing, a satellite type, a satellite orbit, a GNSS accuracy, a look up table associated with a satellite.

In aspect 23, the method of any of aspects 16-22 further includes that the at least one GNSS fix is based on a GNSS time period associated with a velocity of the UE.

In aspect 24, the method of aspect 23 further includes that the velocity of the UE is based on at least one of a difference between GNSS readings or inertial sensor readings.

In aspect 25, the method of any of aspects 16-24 further includes performing slew rate control of a total timing advance that is calculated based on the adjusted self-estimated delay and the cumulative timing advance value, the slew rate control being based on one or more rules or conditions.

Aspect 26 is an apparatus comprising memory and at least one processor, the memory and the at least one processor are configured to perform the method of any of aspects 16-25.

In aspect 27, the apparatus of aspect 26 further comprises: at least one antenna and a transceiver coupled to the at least one antenna and the at least one processor.

Aspect 28 is an apparatus including means for implementing a method or realizing an apparatus as in any of aspects 16-25.

In aspect 29, the system or apparatus of aspect 28 further comprises: at least one antenna and a transceiver coupled to the at least one antenna.

Aspect 30 is a non-transitory computer readable medium storing instructions executable by one or more processors to cause the one or more processors to implement a method as in any of aspects 16-25.

What is claimed is:

1. An apparatus for wireless communication at a user equipment (UE), comprising:
- memory; and
- at least one processor coupled to the memory, the memory and the at least one processor configured to:
  - receive one or more timing advance commands from a non-terrestrial network (NTN);
  - reset, after a global navigation satellite system (GNSS) fix, a cumulative timing advance value based on the one or more timing advance commands from the NTN; and
  - transmit an uplink transmission with a timing advance based on a self-estimated delay and the cumulative timing advance value; and
- wherein the memory and the at least one processor are configured to reset the cumulative timing advance value, in response to the GNSS fix, to remove an accumulated amount between the GNSS fix and a prior GNSS fix, and are further configured to:
  - add, to the cumulative timing advance value, at least one additional timing advance from at least one additional timing advance command after the GNSS fix.

2. The apparatus of claim 1, wherein the memory and the at least one processor are configured to reset the cumulative timing advance value in response to expiration of a timer.

3. The apparatus of claim 1, wherein the memory and the at least one processor are further configured to:
- skip accumulation of a timing advance command to the cumulative timing advance value based on one or more of:
  - a propagation delay change that meets a delay threshold value,
  - a GNSS location change that meets a location change threshold value,
  - a time difference between reception of the timing advance command and a last uplink transmission being more than a timing threshold value, or
  - the timing advance command indicating a same sign of positive or negative change as the self-estimated delay.

4. The apparatus of claim 3, wherein the memory and the at least one processor are further configured to:
- restart a time alignment timer in response to skipping the accumulation of the timing advance command to the cumulative timing advance value.

5. The apparatus of claim 1, wherein the timing advance for the uplink transmission is further based on a threshold metric including one or more of:
- a maximum amount of a magnitude of a timing change in one adjustment,
- a minimum aggregate adjustment rate, or
- a maximum aggregate adjustment rate.

6. The apparatus of claim 5, wherein the threshold metric is based on at least one of a subcarrier spacing, a satellite type, a satellite orbit, a GNSS accuracy, a look up table associated with a satellite.

7. The apparatus of claim 1, wherein the GNSS fix is based on a GNSS time period associated with a velocity of the UE.

8. The apparatus of claim 7, wherein the velocity of the UE is based on at least one of a difference between GNSS readings or inertial sensor readings.

9. The apparatus of claim 1, further comprising:
- at least one antenna; and
- a transceiver coupled to the at least one antenna and the at least one processor.

10. An apparatus for wireless communication at a user equipment (UE), comprising:
- memory; and
- at least one processor coupled to the memory, the memory and the at least one processor configured to:
  - receive one or more timing advance commands from a non-terrestrial network (NTN);
  - calculate an adjusted self-estimated delay based on at least one global navigation satellite system (GNSS) fix, wherein to calculate the adjusted self-estimated delay, the memory and the at least one processor are further configured to filter, or limit, or clip GNSS readings from the GNSS fix and prior GNSS readings; and
  - transmit an uplink transmission with a timing advance based on the adjusted self-estimated delay and a cumulative timing advance value based on the one or more timing advance commands from the NTN; and
- wherein the memory and the at least one processor is further configured to:
  - perform slew rate control of a total timing advance that is calculated based on the adjusted self-estimated delay and the cumulative timing advance value, the slew rate control being based on one or more rules or conditions.

11. The apparatus of claim 10, wherein the adjusted self-estimated delay is a function of at least a current GNSS fix and a prior GNSS fix.

12. The apparatus of claim 10, wherein the adjusted self-estimated delay is based on a last GNSS location from a most recent radio resource control (RRC) idle mode.

13. The apparatus of claim 10, wherein the adjusted self-estimated delay is based on a last GNSS location before a first TA command is received until the UE enters an RRC-Idle/Inactive state or has not received a TA command for a threshold amount of time.

14. The apparatus of claim 10, wherein the adjusted self-estimated delay is based on a last GNSS location before a first TA command is received until the UE performs random access or has not received a TA command for a threshold amount of time.

15. The apparatus of claim 10, wherein the timing advance with which the uplink transmission is transmitted is further based on a threshold metric including one or more of:
- a maximum amount of a magnitude of a timing change in one adjustment,
- a minimum aggregate adjustment rate, or
- a maximum aggregate adjustment rate.

16. The apparatus of claim 15, wherein the threshold metric is based on at least one of a subcarrier spacing, a satellite type, a satellite orbit, a GNSS accuracy, a look up table associated with a satellite.

17. The apparatus of claim 10, wherein the at least one GNSS fix is based on a GNSS time period associated with a velocity of the UE.

18. The apparatus of claim 17, wherein the velocity of the UE is based on at least one of a difference between GNSS readings or inertial sensor readings.

19. The apparatus of claim 10, further comprising:

at least one antenna; and a transceiver coupled to the at least one antenna and the at least one processor.

20. A method of wireless communication at a user equipment (UE), comprising:

receiving one or more timing advance commands from a non-terrestrial network (NTN);

resetting, after a global navigation satellite system (GNSS) fix, a cumulative timing advance value based on the one or more timing advance commands from the NTN; and transmitting an uplink transmission with a timing advance based on a self-estimated delay and the cumulative timing advance value; and wherein the UE resets the cumulative timing advance value, in response to the GNSS fix, to remove an accumulated amount between the GNSS fix and a prior GNSS fix, the method further comprising:

adding, to the cumulative timing advance value, at least one additional timing advance from at least one additional timing advance command after the GNSS fix.

21. The method of claim 20, wherein the UE resets the cumulative timing advance value in response to expiration of a timer.

22. The method of claim 20, further comprising:

skipping accumulation of a timing advance command to the cumulative timing advance value based on one or more of:

a propagation delay change that meets a delay threshold value, a GNSS location change that meets a location change threshold value, a time difference between reception of the timing advance command and a last uplink transmission being more than a timing threshold value, or the timing advance command indicating a same sign of positive or negative change as the self-estimated delay.

23. The method of claim 22, further comprising:

restarting a time alignment timer in response to skipping the accumulation of the timing advance command to the cumulative timing advance value.

24. The method of claim 20, wherein the timing advance with which the uplink transmission is transmitted is further based on a threshold metric including one or more of:

a maximum amount of a magnitude of a timing change in one adjustment, a minimum aggregate adjustment rate, or a maximum aggregate adjustment rate.

25. The method of claim 24, wherein the threshold metric is based on at least one of a subcarrier spacing, a satellite type, a satellite orbit, a GNSS accuracy, a look up table associated with a satellite.

26. The method of claim 20, wherein the GNSS fix is based on a GNSS time period associated with a velocity of the UE.

27. The method of claim 26, wherein the velocity of the UE is based on at least one of a difference between GNSS readings or inertial sensor readings.

28. A method of wireless communication at a user equipment (UE), comprising:

receiving one or more timing advance commands from a non-terrestrial network (NTN);

calculating an adjusted self-estimated delay based on at least one global navigation satellite system (GNSS) fix, wherein calculating the adjusted self-estimated delay comprises filtering, or limiting, or clipping GNSS readings from the GNSS fix and prior GNSS readings; and transmitting an uplink transmission with a timing advance based on the adjusted self-estimated delay and a cumulative timing advance value based on the one or more timing advance commands from the NTN; and performing slew rate control of a total timing advance that is calculated based on the adjusted self-estimated delay and the cumulative timing advance value, the slew rate control being based on one or more rules or conditions.

29. The method of claim 28, wherein the adjusted self-estimated delay is a function of at least a current GNSS fix and a prior GNSS fix.

30. The method of claim 28, wherein the adjusted self-estimated delay is based on a last GNSS location from a most recent radio resource control (RRC) idle mode.

31. The method of claim 28, wherein the adjusted self-estimated delay is based on a last GNSS location before a first TA command is received until the UE enters an RRC-Idle/Inactive state or has not received a TA command for a threshold amount of time.

32. The method of claim 28, wherein the adjusted self-estimated delay is based on a last GNSS location before a first TA command is received until the UE performs random access or has not received a TA command for a threshold amount of time.

33. The method of claim 28, wherein the timing advance with which the uplink transmission is transmitted is further based on a threshold metric including one or more of:

a maximum amount of a magnitude of a timing change in one adjustment, a minimum aggregate adjustment rate, or a maximum aggregate adjustment rate.

34. The method of claim 33, wherein the threshold metric is based on at least one of a subcarrier spacing, a satellite type, a satellite orbit, a GNSS accuracy, a look up table associated with a satellite.

35. The method of claim 28, wherein the at least one GNSS fix is based on a GNSS time period associated with a velocity of the UE.

36. The method of claim 35, wherein the velocity of the UE is based on at least one of a difference between GNSS readings or inertial sensor readings.

* * * * *